(12) United States Patent
Mabuchi et al.

(10) Patent No.: US 8,431,879 B2
(45) Date of Patent: Apr. 30, 2013

(54) SOLID-STATE IMAGING DEVICE AND DRIVE CONTROL METHOD FOR THE SAME

(75) Inventors: Keiji Mabuchi, Kanagawa (JP); Eiichi Funatsu, Tokyo (JP); Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/231,365

(22) Filed: Sep. 2, 2008

(65) Prior Publication Data

US 2009/0072123 A1    Mar. 19, 2009

Related U.S. Application Data

(62) Division of application No. 10/826,038, filed on Apr. 16, 2004, now Pat. No. 7,468,750.

(30) Foreign Application Priority Data

Apr. 18, 2003    (JP) .................................. 2003-113840

(51) Int. Cl.
*H01L 27/00*    (2006.01)
(52) U.S. Cl.
USPC ........ 250/208.1; 348/296; 348/297; 348/308; 348/314
(58) Field of Classification Search ............... 250/208.1; 348/308, 296, 297, 314
See application file for complete search history.

(56) References Cited

U.S. PATENT DOCUMENTS

| | | | |
|---|---|---|---|
| 5,068,736 A * | 11/1991 | Hamasaki | 348/296 |
| 5,907,357 A | 5/1999 | Maki | |
| 5,933,188 A | 8/1999 | Shinohara et al. | |
| 6,054,704 A | 4/2000 | Pritchard et al. | |
| 6,512,543 B1 | 1/2003 | Kuroda et al. | |
| 6,522,365 B1 | 2/2003 | Levantovsky et al. | |
| 7,110,030 B1 * | 9/2006 | Kochi et al. | 348/308 |
| 7,224,391 B2 | 5/2007 | Kimura | |
| 2001/0012133 A1 | 8/2001 | Yoneda et al. | |
| 2002/0109160 A1 * | 8/2002 | Mabuchi et al. | 257/233 |
| 2003/0179304 A1 * | 9/2003 | Kuroda et al. | 348/304 |

FOREIGN PATENT DOCUMENTS

| | | |
|---|---|---|
| EP | 0734026 | 9/1996 |
| EP | 0905971 | 3/1999 |
| JP | 02-005474 | 1/1990 |
| JP | 2005474 | 10/1990 |
| JP | 10-093066 | 4/1998 |
| JP | 2001-230400 | 8/2001 |

(Continued)

*Primary Examiner* — Georgia Y Epps
*Assistant Examiner* — Kevin Wyatt
(74) *Attorney, Agent, or Firm* — Robert J. Depke; The Chicago Technology Law Group, LLC.

(57) ABSTRACT

A CMOS sensor has unit pixels each structured by a light receiving element and three transistors, to prevent against the phenomenon of saturation shading and the reduction of dynamic range. The transition time (fall time), in switching off the voltage on a drain line shared in all pixels, is given longer than the transition time in turning of any of the reset line and the transfer line. For this reason, the transistor constituting a DRN drive buffer is made proper in its W/L ratio. Meanwhile, a control resistance or current source is inserted on a line to the GND, to make proper the operation current during driving. This reduces saturation shading amount. By making a reset transistor in a depression type, the leak current to a floating diffusion is suppressed to broaden the dynamic range.

5 Claims, 18 Drawing Sheets

FOREIGN PATENT DOCUMENTS

| | | |
|---|---|---|
| JP | 2001-332714 | 11/2001 |
| JP | 2002-077731 | 3/2002 |
| JP | 2002-335455 | 11/2002 |
| WO | WO 0260174 | 1/2002 |

* cited by examiner

*DEVICE STRUCTURE
- VGA-COMPATIBLE CMOS SENSOR (APPROX. 0.3 MILLION PIXELS)
- CLOCK FREQUENCY: 6MHz (FRAME RATE 13.3fps)
- UNIT PIXEL IN 3-TRANSISTOR STRUCTURE
- PIXEL PITCH 4.1μm

*DRIVE CONDITION
- POWER VOLTAGE 3.0V
- TRANSFER GATE DRIVE VOLTAGE HAVING VARIABLE LOW LEVEL
- OTHER DRIVING TO THE PIXEL BY 0V AND POWER VOLTAGE (3.0V)

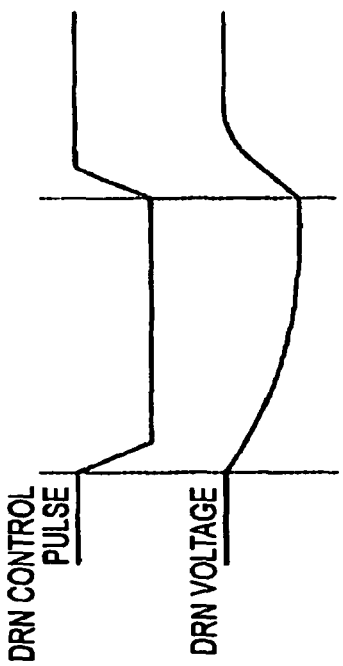
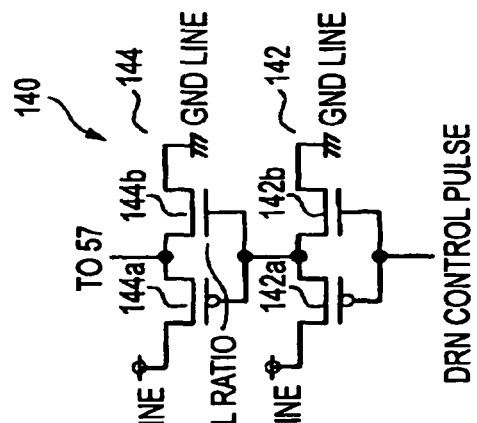
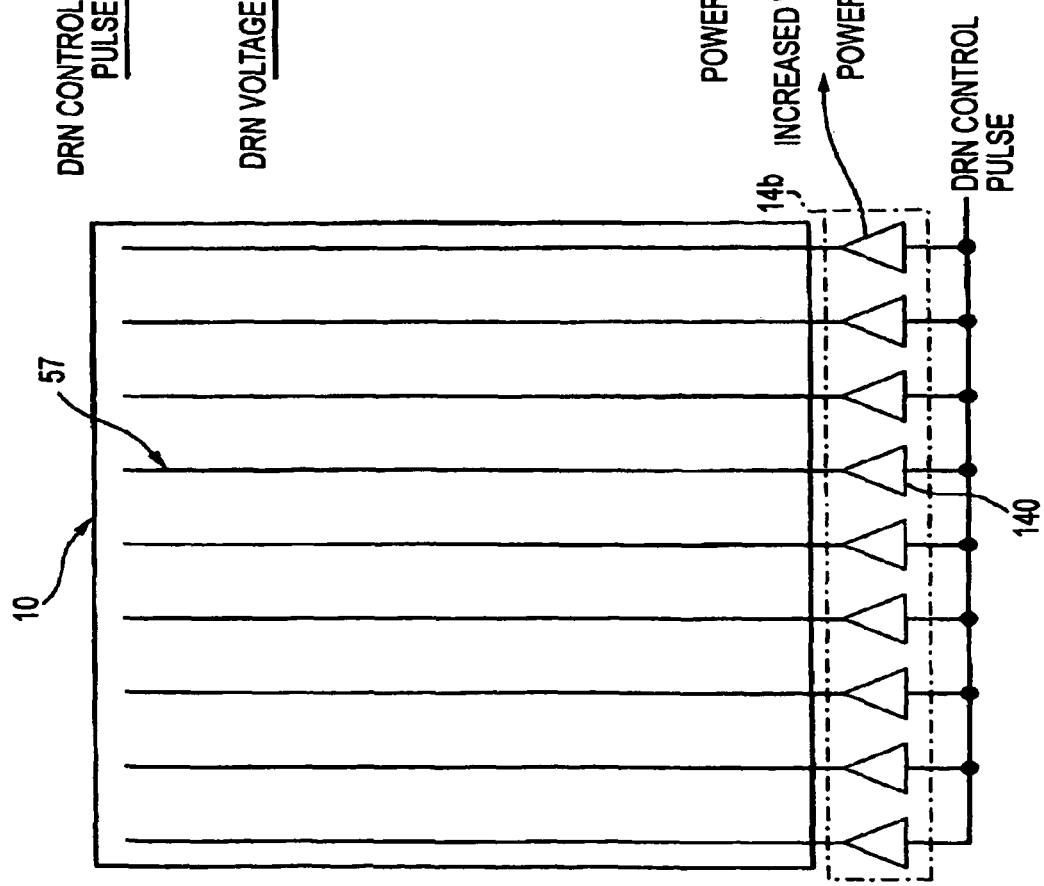

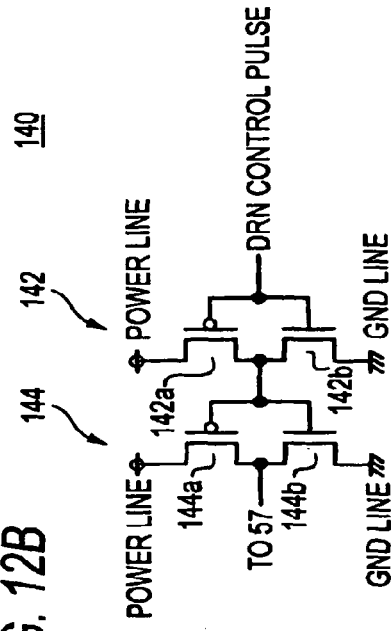

FIG. 12C

EXAMPLE OF BUFFER FINAL-STAGED NMOS W/L
(FOR PIXEL-COUNT VGA CLASS)

| | USUAL DESIGN (FALL OF SEVERAL ns OR LESS) | EMBODIMENT DESIGN (PRACTICAL VALUE AT FALL OF 40-10ns) |
|---|---|---|
| BUFFERS PRESENT ON EACH COLUMN | 10/0.6 | 1/0.6-1/20 (USUAL RATIO 1/10 OR LESS) |
| BUFFERS PRESENT AT BOTH ENDS OF EACH ROW | 6/0.6 | 1/1-1/20 (USUAL RATIO 1/10 OR LESS) |
| DRIVING DRN LINES ON THE PIXEL-REGION ENTIRE SURFACE BY ONE BUFFER | 5000/0.6 | 500/0.6-2/20 (USUAL RATIO 1/10 OR LESS) |

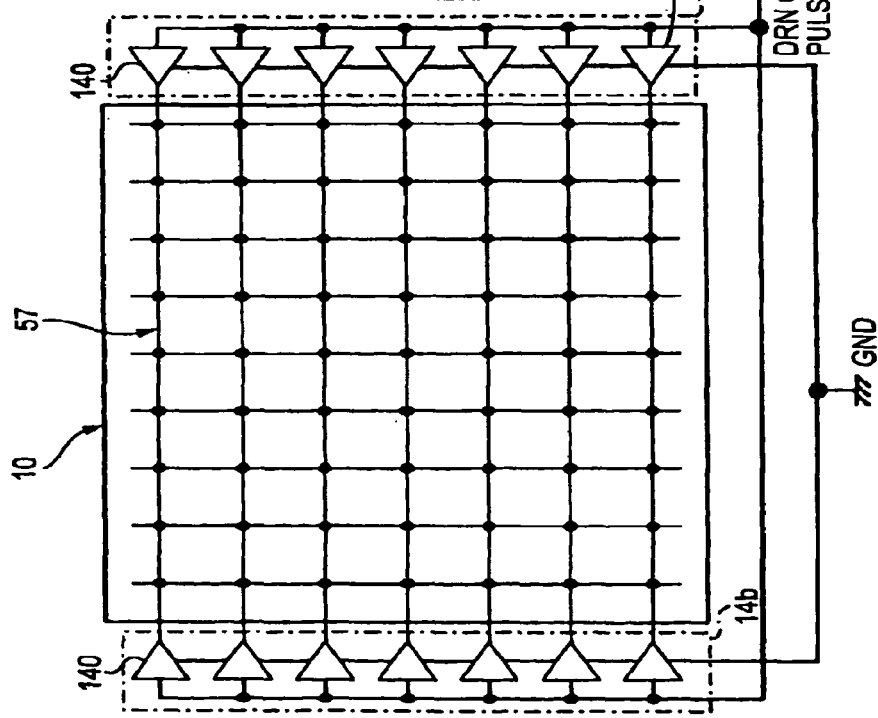

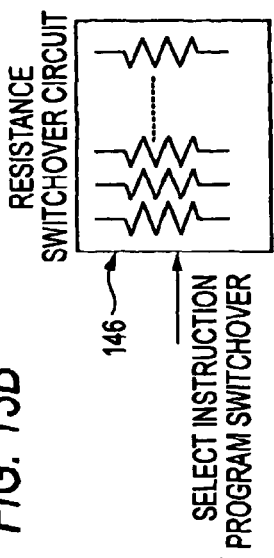
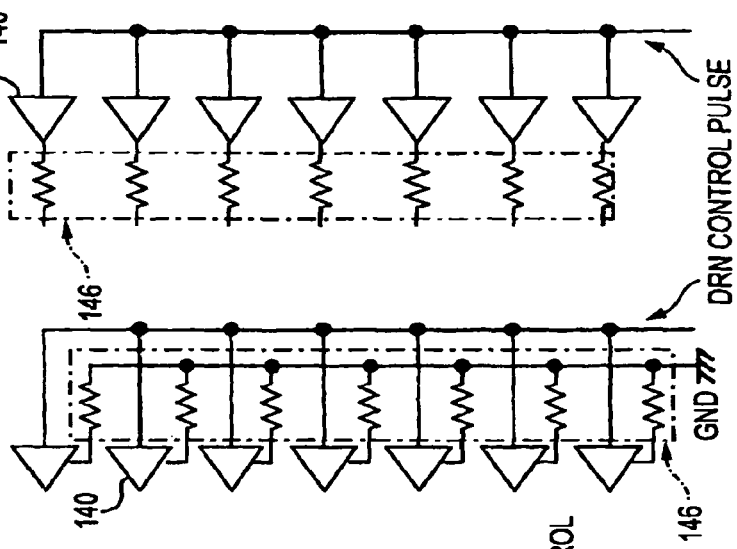
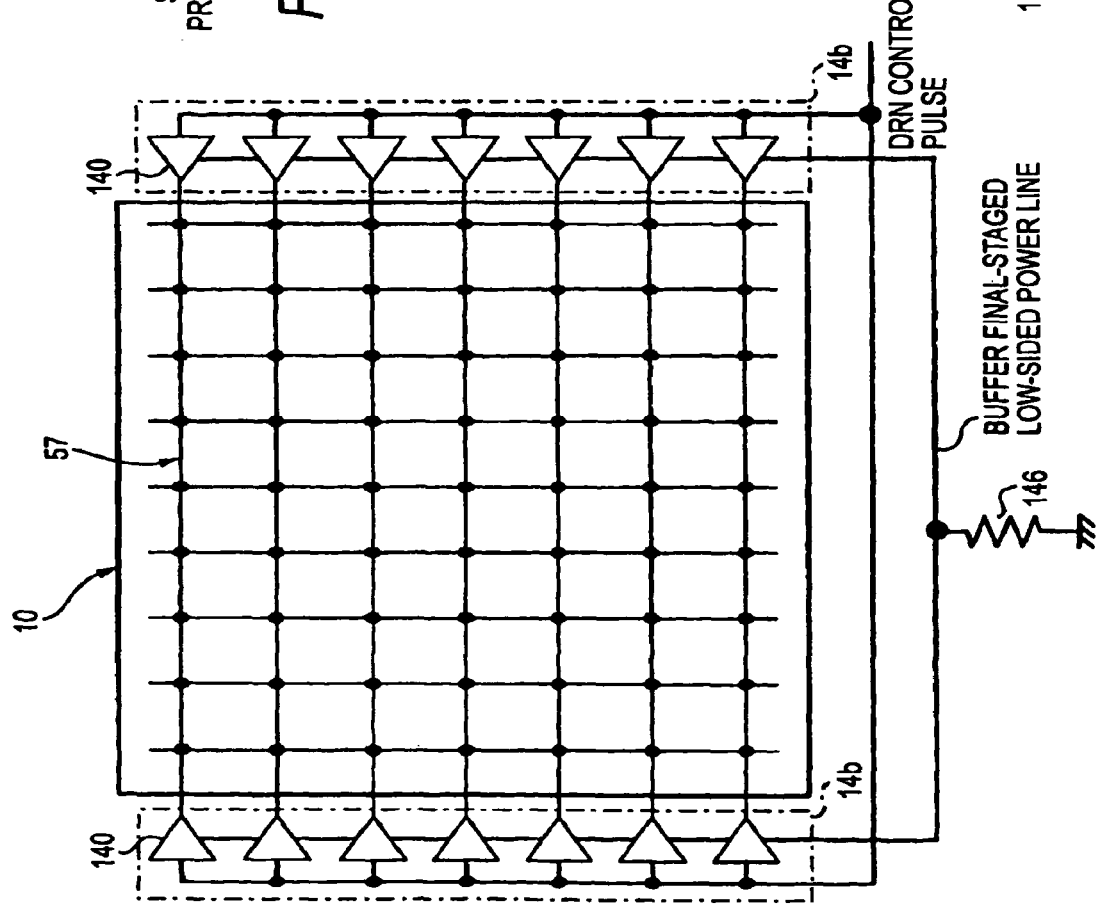

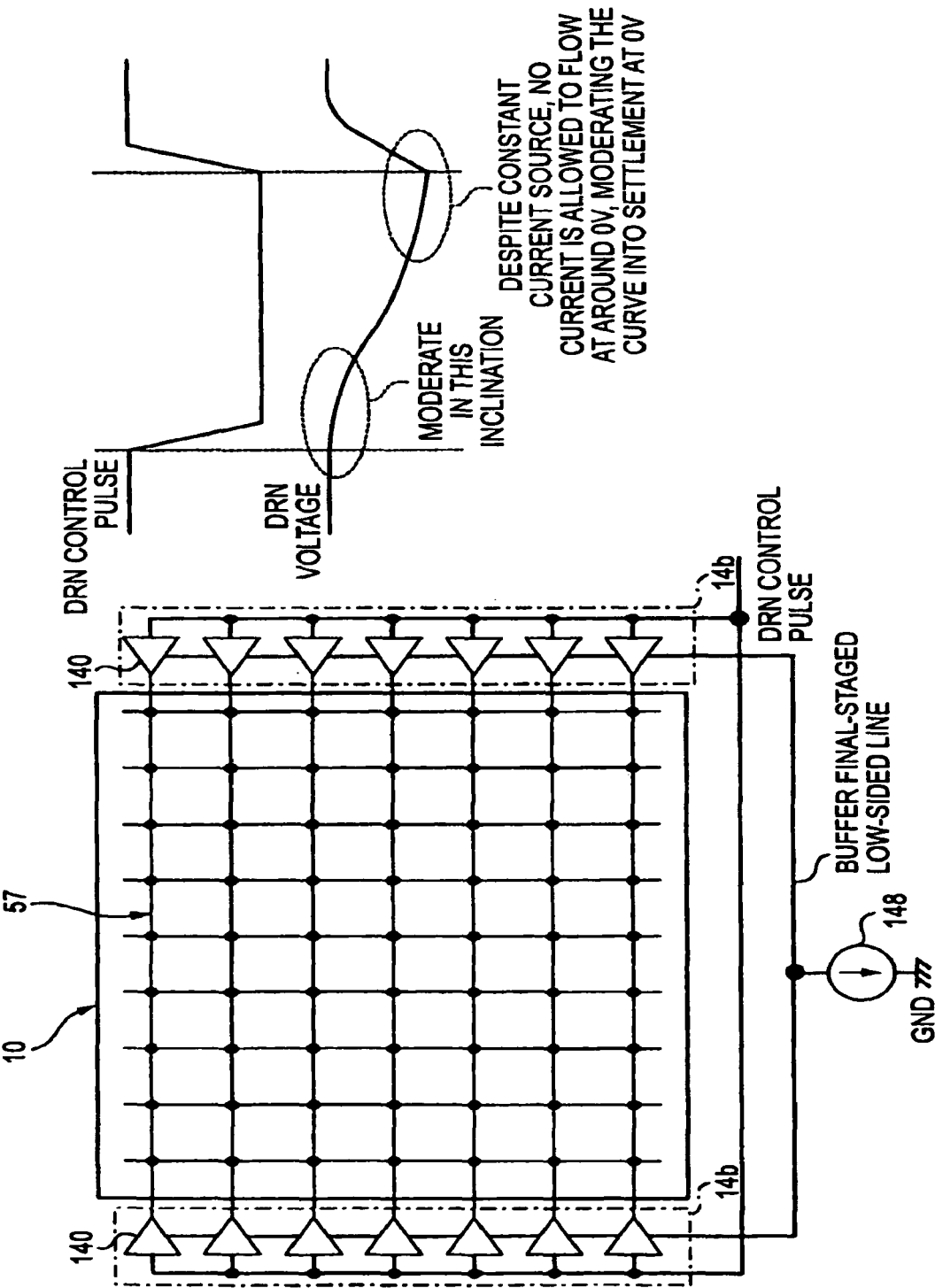

SOLID-STATE IMAGING DEVICE AND DRIVE CONTROL METHOD FOR THE SAME

The subject matter of application Ser. No. 10/826,038, is incorporated herein by reference. The present application is a divisional of U.S. Ser. No. 10/826,038, filed Apr. 16, 2004 now U.S. Pat. No. 7,468,750, which claims priority to Japanese Patent Application No. JP 2003-113840, filed Apr. 18, 2003. The present application claims priority to these previously filed applications.

BACKGROUND OF THE INVENTION

1. Technical Field of the Invention

The present invention relates to a solid-state imaging device arranged with a plurality of unit pixels so that a signal can be desirably selected and read out of the individual unit pixel under address control, and to a control method for the same. More particularly, the invention relates to a solid-state imaging device of a type having unit pixels each structured by a photoelectric converter element and three transistors without having a select transistor, and to a drive control method for the same.

2. Description of the Related Art

The amplification-type solid-state imaging device (APS: Active Pixel Sensor, also called a gain cell) as one kind of X-Y addressing solid-state imaging device is structured with pixels by the use of active elements (MOS transistors) such as the MOS structure, in order to provide the pixel with an amplification function. Namely, the signal charge (photoelectrons), stored on the photodiode as a photoelectric converter element, is amplified by the active element and read out as image information.

In the X-Y addressing solid-state imaging device of this +kind, a pixel region is constituted, for example, by arranging a multiplicity of pixel transistors in a two-dimensional matrix form. The storage of a signal charge corresponding to incident light is commenced line by line (row) or pixel by pixel so that the current or voltage signal based on the stored signal charge can be sequentially read out of the pixels by address designation.

<Conventional Unit-Pixel Structure: First Example>

FIG. 19A shows a first example of conventional unit pixel 3. The unit pixel 3 of the first example is of a 4-transistor structure generally employed as a CMOS sensor, as broadly known in the conventional.

The unit pixel 3 of the first example has a charge generating section 32 having a photoelectric converting function to convert light into charge and also a charge storing function to store the charge, a read select transistor 34 as an example of a charge reading section (transfer gate section/read gate section) with respect to the charge generating section 32, a reset transistor 36 as an example of reset gate section, a vertical select transistor 40, and an amplifier transistor 42 in a source-follower configuration as an example of a detector element to detect a potential change at a floating diffusion 38.

The read select transistor 34 is to be driven by a transfer drive buffer 150 through a transfer line (read select line) 55. The reset transistor 36 is to be driven by a reset drive buffer 152 through a reset line 56. The vertical select transistor 40 is to be driven by a select drive buffer 154 through a vertical select line 52.

Meanwhile, the unit pixel 3 has a pixel-signal generating section 5 in an FDA (floating diffusion amp.) structure with a floating diffusion 38 as an example of charge injecting section having a function of charge storing part. The floating diffusion 38 is a diffusion layer having a parasitic capacitance.

The reset transistor 36 of the pixel-signal generating section 5 has a source connected to the floating diffusion 38, a drain connected to the power source VDD, and a gate (reset gate RG) to which a reset pulse RST is to be inputted from the reset drive buffer 152.

The vertical select transistor 40 has a drain connected to the power source VDD, a source connected to the drain of the amplifier transistor 42, and a gate (particularly referred to as a vertical select gate SELV) connected to the vertical select line 52. To the vertical select line 52, a vertical select signal is to be applied. The amplifier transistor 42 has a gate connected to the floating diffusion 38, a drain connected to the source of the vertical select transistor 40, and a source connected to the vertical signal line 53 through the pixel line 51.

In this arrangement, the floating diffusion 38 is connected to the gate of the amplifier transistor 42. Accordingly, the amplifier transistor 42 outputs a signal commensurate with the potential at the floating diffusion 38 (hereinafter referred to as an FD potential) onto the vertical signal line 53 through the pixel line 51. The reset transistor 36 resets the floating diffusion 38. The read select transistor (transfer transistor) 34 transfers the signal charge generated by the charge generating section 32 to the floating diffusion 38. A multiplicity of pixels are connected to the vertical signal line 53. In order to select a pixel, the selected pixel only is turned on at its vertical select transistor 40. Thereupon, the selected pixel only is connected to the vertical signal line 53, to output a signal of the selected pixel onto the vertical signal line 53.

In this manner, the unit pixel 3 is generally structured with the vertical select transistor 40 for the purpose of pixel selection. The unit pixel 3 in most today's CMOS sensors possesses a select transistor.

<Conventional Unit-Pixel Structure: Second Example>

Contrary to this, there is a proposal of a unit pixel 3 structured by a photoelectric converter element and three transistors as shown in FIG. 19B (hereinafter referred to as a second example of unit pixel 3), as a technology for reducing the pixel size by decreasing the area the transistor occupies within the unit pixel 3 (see Patent Document 1, for example).

[Patent Document 1]
Japanese Patent No. 2708455

The unit pixel 3 of the second example has a charge generating section 32 (e.g. photodiode) for generating signal charge commensurate with the light received by photoelectric conversion, an amplifier transistor 42 connected to the drain line (DRN) and for amplifying a signal voltage corresponding to the signal charge generated by the charge generating section 32, and a reset transistor 36 for resetting the charge generating section 32. Meanwhile, a read select transistor (transfer gate section) 34, to be scanned by a not-shown vertical shift register through the transfer line (TRF) 55, is provided between the charge generating section 32 and the gate of amplifier transistor 42.

The gate of the amplifier transistor 42 and the source of the reset transistor 36 are connected to the charge generating section 32 through the read select transistor 34 while the drain of the reset transistor 36 and the drain of the amplifier transistor 42 are connected to the drain line. Meanwhile, the source of the amplifier transistor 42 is connected to the vertical signal line 53. The read select transistor 34 is to be driven by a transfer drive buffer 150 through a transfer line 55. The reset transistor 36 is to be driven by a reset drive buffer 152 through the rest line 56. The transfer drive buffer 150 and the reset drive buffer 152 are both to operate on two values, i.e. reference voltage 0 V and power voltage. Particularly, the low level voltage to be supplied to the gate of the conventional-example read select transistor 34 in the pixel is 0 V.

In the unit pixel 3 of the second example, the floating diffusion 38 is connected to the gate of the amplifier transistor 42 similarly to the first example. Accordingly, the amplifier transistor 42 outputs to the vertical signal line 53 a signal commensurate with the potential at the floating diffusion 38.

The reset transistor 36 has a reset line (RST) 56 extending in the row direction and a drain line (DRN) 57 provided common between most of the pixels. The drain line (DRN) 57 is to be driven by a drain drive buffer (hereinafter referred to as a DRN drive buffer) 140. The reset transistor 36 is to be driven by the reset drive buffer 152, to control the potential at the floating diffusion 38. Here, the technique described in Patent Document 1 has the drain line 57 separated in the row direction. The drain line 57 has to flow a signal current in an amount of the pixels of one row, hence being actually a line common between all the rows in order to flow current in the column direction.

The signal charge generated by the charge generating section 32 (photoelectric converter element) is transferred to the floating diffusion 38 by the read select transistor 34.

Here, the unit pixel 3 of the second example is not provided with a vertical select transistor 40 connected series with the amplifier transistor 42, differently from the first example. Although the vertical signal line 53 is connected with a multiplicity of pixels, pixel selection is effected not by a select transistor but under control of FD potential. Usually, the FD potential is kept low. When selecting a pixel, the FD potential is raised high at a selected pixel, to send a signal of the selected pixel onto the vertical signal line 53. Thereafter, the FD potential at the selected pixel is returned to a low. This operation is effected simultaneously on the pixels of one row.

For FD potential control in this manner, operations are made, i.e. 1) when the FD potential on the selecting row is made high, the drain line 57 is raised to the high to thereby raise the FD potential to the high through the reset transistor 36 on the selected row, and 2) when the FD potential on the selected row is returned to the low, the drain line 57 is made low to thereby decrease the FD potential to the low through the reset transistor 36 on the selecting row.

However, the present inventor has trial-manufactured a solid-state imaging device structured by the second type of unit pixels 3, and thereby recognized the problems, i.e. 1) the characteristic is different between the pixel at the periphery and the pixel at the center, thus causing shading phenomenon wherein, particularly, the maximum charge (saturation electrons) to be stored on the photoelectric converter element is less at the center, and 2) dynamic range is narrow.

In respect of the two problems, the present inventor has analyzed the phenomena and revealed the followings.

1) The drain line 57 is a line extending through nearly the entire of the pixel region. When driving it, there occurs potential fluctuation on the well (hereinafter, explanation continued with a P-type well) of the pixel region. Although the contact for giving a potential to the P-well is placed around the pixel region, the manner of P-well potential fluctuation differs depending upon a distance from the contact, thus causing variations in the pixel characteristic. Particularly, when the drain line 57 is made low, the P-well is biased toward the negative, thereby leaking a signal charge from the charge generating section 32 to the floating diffusion 38 and P-well. At the center located distant from the contact of the P-well, the P-well potential fluctuation is greater to thereby lose saturation electrons at the center. This is called saturation shading.

2) Following the period of driving the selected-row pixel and reading a signal therefrom (H ineffective period), there is a period to sequentially output the signal to the outside (H effective time). During the H effective period, in the case of driving to maintain the drain line 57 high, the FD potential gradually rises due to the leak current through the reset transistor 36. Due to this, because the difference decreases between the selected row and the non-selected row, dynamic range is delimited and narrowed.

The two problems and analysis results are the new matters not to exist on the CMOS sensor of a type to select every pixel by the vertical select transistor 40.

The present invention has been made in view of the above situation, and it is a first object to provide a drive technique capable of improving the shading phenomenon, particularly the saturation shading phenomenon, as encountered in using a device having unit pixels in a three-transistor structure.

Meanwhile, the present invention has been made in view of the above situation, and it is a second object to provide a drive technique capable of improving the reduction of dynamic range resulting from the leak current from the reset transistor, as encountered in using a device having unit pixels in a three-transistor structure.

SUMMARY OF THE INVENTION

A drive control method of the present invention is a drive control method for a solid-state imaging device having unit pixels structured by including a charge generating section for generating a signal charge commensurate with a received light and three transistors. The drive voltage to the drain line is driven by being blunted such that the off transition time on a voltage waveform in driving the drain line is longer (preferably, in a range of five times or greater and ten thousand times or smaller, more preferably 50 to 600 times) than the off transition time on a voltage waveform in driving any of the reset line and transfer line.

A first solid-state imaging device according to the invention is a solid-state imaging device arranged for implementing the foregoing drive control method of the invention. The drive voltage to the drain line can be driven by being blunted such that, when a drive pulse is applied to the drain drive buffer, the off transition time on a voltage waveform in driving the drain line is longer (preferably, in a range of five times or greater and ten thousand times or smaller, more preferably 50 to 600 times) than the off transition time on any of the reset line to be driven by a reset drive buffer and the transfer line to be driven by the transfer drive buffer. Incidentally, the transition time of a drive pulse itself to be applied to each drive buffer may be made as a "pulse" in a general concept having a fall and rise fully shortened.

The arrangement, in which off transition time on the drain line satisfies the foregoing condition, can employ various contrivances. For example, the transistor connected to the drain line may have a W/L ratio set in a range of 1/5 times to 1/2500 times, preferably 1/10 times to 1/500 times, of any of the W/L ratio of the transistor connected to the transfer line and the W/L ratio of the transistor connected to the reset line (corresponding to the improve technique based on the first approach in the embodiment; the first example, referred later).

Meanwhile, a resistance element for limiting a drive current may be provided between an off reference line of the drain drive buffer and a reference line regulating an off voltage to the drain line (corresponding to the improve technique based on the first approach in the embodiment; the second example, referred later). By adjusting the value of the resistance element, the foregoing condition can be fulfilled. Also, by adjustment, setting is possible to the optimal state reduced in saturation shading. With a variable resistance value, the arrangement is more preferable.

Meanwhile, a current source for regulating a drive current may be provided between an off reference line of the drain drive buffer and a reference power source regulating an off voltage to the drain line (corresponding to the improve technique based on the first approach in the embodiment; the third example, referred later). With a variable drive current, the arrangement is more preferable.

Meanwhile, a second solid-state imaging device of the invention is a solid-state imaging device having unit pixels structured by including a charge generating section for generating a signal charge commensurate with a received light and three transistors wherein, by making negative the low level voltage of the gate of a read select transistor, a potential barrier is formed to prevent the charge from leaking from the charge generating section to the charge storing part (corresponding to the improve technique based on the second approach in the embodiment, referred later). Incidentally, the voltage is given in a magnitude of range not to cause breakdown. Meanwhile, the off voltage is preferably set with a negative voltage in a magnitude capable of generating a hole channel at an interface of a semiconductor structuring the unit pixels. With a variable setting voltage, the arrangement is more preferable.

A third solid-state imaging device of the invention is a solid-state imaging device having unit pixels structured by including a charge generating section for generating a signal charge commensurate with the received light and three transistors, wherein unit pixels are arranged providing a bias line to fix the potential on the well formed of a semiconductor (corresponding to the improve technique based on the third approach in the embodiment, referred later). In this case, it is preferred to provide each unit pixel with a contact connecting between the bias line and the well.

A fourth solid-state imaging device of the invention is a solid-state imaging device having unit pixels structured by including a charge generating section for generating a signal charge commensurate with the received light and three transistors, wherein a reset section for resetting a signal charge at the charge storing part is structured by a transistor in a depression type (corresponding to the improve technique based on the fourth approach in the embodiment, referred later). In this case, the transistor of the reset section is preferably to set the charge storing part at a resetting level of nearly a voltage level on the active drain line.

A fifth solid-state imaging device of the invention is a solid-state imaging device comprising: an imaging region arranged with a plurality of pixels; and a circuit region for supplying a drive pulse to the imaging region; the pixel having a photoelectric converting section for generating a charge commensurate with an amount of incident light, a charge storing part for storing a charge read from the photoelectric converting section by a transfer gate section, and a reset section for resetting the charge stored at the charge storing part; wherein the transfer gate is connected with a transfer line, the reset section is connected with a reset line and the charge storing part is connected with a drain line through the reset section; the circuit region supplying a first pulse toward the drain line, a second pulse toward the reset line and a third pulse toward the transfer line; the first pulse having a waveform longer in off transition time than a waveform of the second pulse and third pulse.

The present invention has been made by conducting an analysis on the problem of the unit pixel in a three-transistor structure noted in the prior art, and finding a resolution technique (operation principle and the effect) to be detailed later in the embodiment.

For example, the technique based on the first approach has been made by finding points, i.e. saturation shading is reduced by increasing the transition time (e.g. fall time in switching over to the low, on the NMOS sensor) in turning off the voltage to the drain line common to all the pixels, the optimal value thereof exits under certain device drive condition, and so on. For example, applied is a technique of making proper the W/L ratio of a transistor structuring the drive buffer or making proper the operation current during drive by inserting a control resistance or current source between reference voltages. Due to this, the transition time in turning off the drain voltage is increased longer than the transition time in turning off any of the reset line and the transfer line, preferably five times or greater and ten thousand times or smaller. This makes uniform the characteristic between the pixels at the periphery and at the center, thereby reducing saturation shading.

Meanwhile, the technique based on the second approach can make the potential barrier high relative to the charge storing part by deepening (switching toward the negative, if on the NMOS sensor) the electrode voltage during turning off the read select transistor than a master reference voltage (e.g. GND level) regulating the reference voltage over the pixel entirety, thereby reducing saturation shading.

Meanwhile, the technique based on the third approach has been made by finding the point that the fluctuation of well potential can be suppressed by providing a bias line for fixing the well potential, making it possible to reduce shading.

Meanwhile, the technique based on the fourth approach has been made by finding the point that, by making in a depression type the reset transistor of the reset section structuring the unit pixel, leak current is suppressed to a charge storing part such as the floating diffusion thereby broadening the dynamic range at the charge storing part.

Incidentally, the improvement technique based on the first to fourth approach can be applied in a desired combination without limited to single application.

BRIEF DESCRIPTION OF THE DRAWINGS

FIG. 11 is a figure explaining a first example of fall time control method according to an improvement technique based on the first approach;

FIG. 12 is a figure explaining a modification to the technique realizing the fall time control method in the first example;

FIG. 13 is a figure explaining a second example of fall time control method according to an improvement technique based on the first approach;

FIG. 14 is a figure explaining a third example of fall time control method according to an improvement technique based on the first approach;

DETAILED DESCRIPTION OF THE INVENTION

Now embodiments of the present invention will be explained in detail with reference to the drawings. Note that the below exemplifies the application to a CMOS imaging device, an example of an X-Y addressing solid-state imaging device. Meanwhile, the CMOS imaging device is explained on the assumption that all the pixels are configured by the NMOS.

<Solid-State Imaging Device Arrangement>

FIG. 1 is a schematic arrangement diagram of a CMOS solid-state imaging device according to an embodiment of the present invention. The solid-state imaging device 1 is applicable as an electronic still camera capable of imaging for color pictures. For example, in a still-picture imaging mode, setting is made to a mode for reading all the pixels.

Figure 1A:
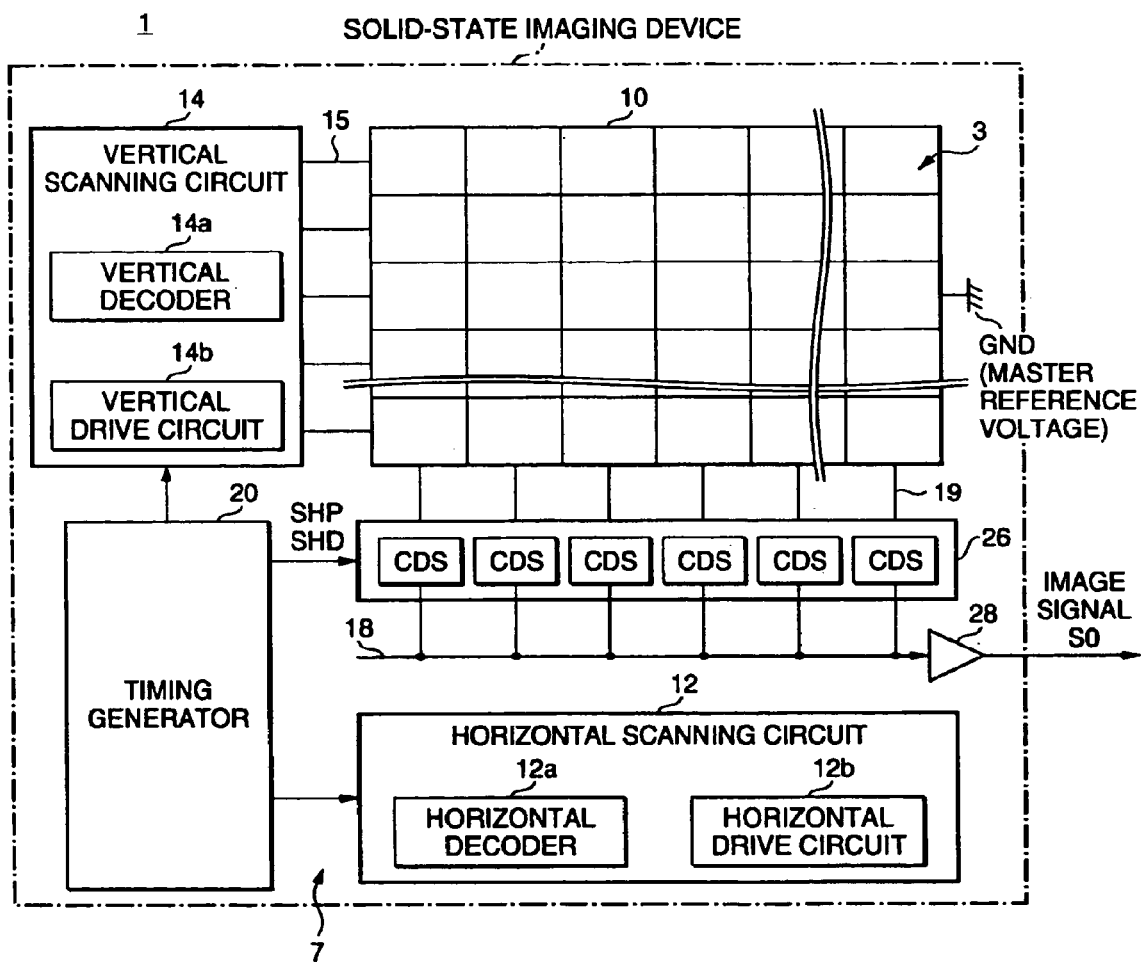
FIG. 1 is a schematic arrangement diagram of a CMOS solid-state imaging device according to an embodiment of the present invention.

The solid-state imaging device 1 has an imaging section arranged, on rows and columns, with pixels (i.e. in two-dimensional matrix form) including light-receiving elements to output a signal commensurate with the amount of incident light, providing an signal output, or voltage signal, from each pixel. Namely, this is a column type having CDS (correlated double sampling) process functioning sections on the respective columns. Specifically, as shown in FIG. 1A, the solid-state imaging device 1 has a pixel section (imaging section) 10 arranged with a plurality of unit pixels 3 on rows and columns, a drive control section 7 provided at the outside the pixel section 10, and a CDS processing section (column circuit) 26. The drive control section 7 has a horizontal scanning circuit 12 and a vertical scanning circuit 14, for example.

Although FIG. 1A shows rows and columns by omitting part thereof in order for simplicity, actually several tens to several thousands of pixels are arranged on each row or column. Meanwhile, the drive control section 7 has another constituent element, i.e. a timing generator (one example of read-out address control unit) 20 for supplying a pulse signal in predetermined timing to the horizontal-scanning circuit 12, vertical-scanning circuit 14 and CDS processing section 26. Those elements of the drive control section 7 are integrally formed, together with the pixel section 10, on a semiconductor region of single-crystal silicon or the like by the use of a similar technique to the semiconductor integrated circuit fabrication art. Thus, those are arranged to constitute a solid-state imaging element (imaging device), an example of a semiconductor system. The unit pixels 3 in the pixel section 10 are connected to the ground (GND), a master reference voltage that defines the reference voltage for the device entirety.

Incidentally, the timing generator 20 may be provided as a separate semiconductor integrated circuit, independently of the other functioning elements such as the pixel section 10 and the horizontal scanning circuit 12. In this case, an imaging device is architected by an imaging device having a pixel section 10, a horizontal scanning section 12 and the like, in combination with a timing generator 20. This imaging device may be provided as an imaging module built with a peripheral signal processing circuit, a power supply circuit and so on.

Figure 19A:
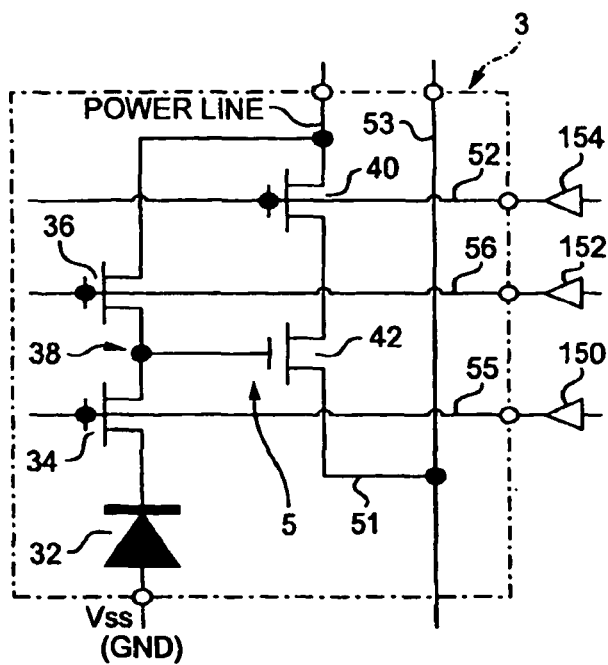
FIG. 19 is a figure showing a structural-example of a unit pixel in the conventional CMOS sensor.
Figure 19B:
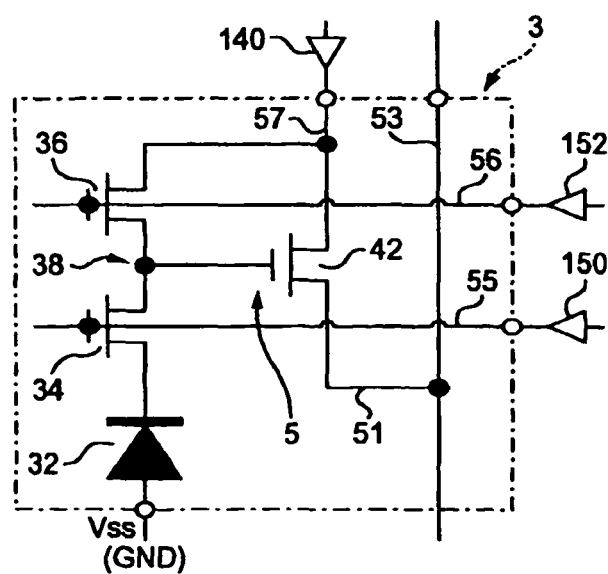

The unit pixels 3 are connected to the vertical scanning circuit 14 through vertical control lines 15 for selecting a vertical column and to the CDS processing section 26 through vertical signal lines 19, respectively. Here, the vertical control lines 15 represent the interconnection overall extending from the vertical scanning circuit 14 to the pixels. For example, in the pixel of FIG. 19B, where a transfer line 55, a reset line 56 and a drain line extend from the vertical scanning circuit 14, the drain line also is included. The horizontal scanning circuit 12 and the vertical scanning circuit 14 are configured including for example a decoder, to start a shift operation (scanning) in response to the drive pulse given from the timing generator 20. Consequently, the vertical control line 15 includes various pulse signals (e.g. reset pulse RST, transfer pulse TRF, and DRN control pulse DRN) for driving the unit pixel 3.

The CDS processing section 26 is provided as a column circuit on each column, to receive a signal in an amount of the pixels of one row and process the signal. For example, this carries out a process to take a difference between a signal level (noise level) and a signal level immediately after resetting the pixel, on the voltage-mode pixel signal inputted through the vertical signal line 19, on the basis of two sample pulses SHP and SHD supplied from the timing generator 20. This removes noise signal components, called fixed pattern noise (FPN) and reset noise. Incidentally, in the rear stage to the CDS processing section 26, an AGC (auto gain control) circuit and ADC (analog digital converter) circuit can be provided as required in the same semiconductor region as the CDS circuit section 26.

The horizontal scanning circuit 12 has a horizontal decoder 12a for regulating a horizontal column to be read (selecting an individual column circuit of within the CDS processing section 26) and a horizontal drive circuit 12b for guiding the signal of each CDS processing section 26 onto a horizontal signal line 18 according to a read address as defined by the horizontal decoder 12a. The vertical scanning circuit 14 has a vertical decoder 14a for regulating a vertical row to be read (selecting a row of the pixel section 10) and a vertical drive circuit 14b for supplying a pulse onto and driving the control line to the unit pixels 3 on the read address (in row direction) as defined by the vertical decoder 14a. Incidentally, the vertical decoder 14a is to select a row for electronic shutter, etc., besides a row to read out a signal. The timing generator 20 outputs a horizontal address signal to the horizontal decoder 12a and a vertical address signal to the vertical decoder 14a. In response, the decoder 12a, 14a selects the corresponding row or column.

The voltage signal processed by the CDS processing section 26 is conveyed to the horizontal signal line 18 through a not-shown horizontal select switch driven on a horizontal select signal from the horizontal scanning circuit 12. The signal is further inputted to an output buffer 28, and thereafter supplied as an imaging signal SO to an external circuit 100. Namely, in the column-type solid-state imaging device 1, the output signal (voltage signal) from the unit pixel 3 is outputted through the vertical signal line 19, the CDS processing section 26, the horizontal signal line 18 and the output buffer 28, in the order. In the driving, a pixel-output signal in an amount of one row is sent parallel to the CDS processing sections 26 through the vertical signal lines 19 while the CDS-processed signal is outputted serial through the horizontal signal line 18. The vertical control lines 15 are for control in selecting a row.

Incidentally, as long as driving is available based on each vertical column or horizontal row, there is a freedom as to whether the pulse signals are arranged in the row direction or in the column direction with respect to the unit pixel 3, i.e. how to make a physical interconnection of drive clock lines for applying pulse signals.

As referred later, it is preferred to supply a negative voltage to the pixel through the vertical drive circuit 14b. For this reason, there is a possible case to mount a negative voltage generating circuit. Naturally, negative voltage may be externally supplied instead of mounting the same.

Figure 1B:
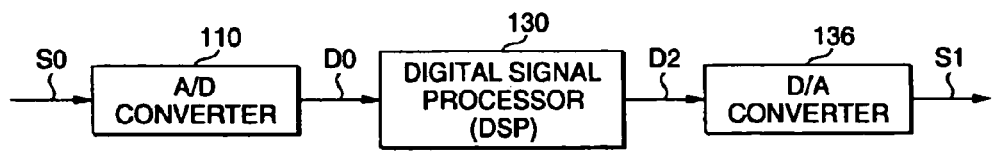

The external circuit 100 for the solid-state imaging device 1 takes a circuit configuration corresponding to the picture-taking modes. For example, as shown in FIG. 1B, provided are an A/D (analog to digital) converter section 110 for converting the analog photographic signal SO outputted from the output buffer 28 into digital photographic data D0, and a digital signal processing (DSP) section 130 for carrying out a digital signal processing based on the photographic data D0 digitized by the A/D converter section 110. The digital signal processing section 130 carries out a color-separation process and generates image data RGB representative of R (red), G (green) and B (blue) images, and makes another signal process on the image data RGB thereby generating image data D2 for output onto the monitor. Meanwhile, the digital signal processing section 130 has a functioning section to make a signal compression process in order to save photographic data onto a recording media.

Meanwhile, the external circuit 100 has a D/A (digital to analog) converter section 136 for converting the image data D2 digital-processed by the digital-signal processing section 130 into an analog image signal S1. The image signal S1 outputted from the D/A converter section 136 is forwarded to a not-shown display device, such as a liquid-crystal monitor. The operator is allowed to make various operations while viewing a display image on the display device.

Figure 9:
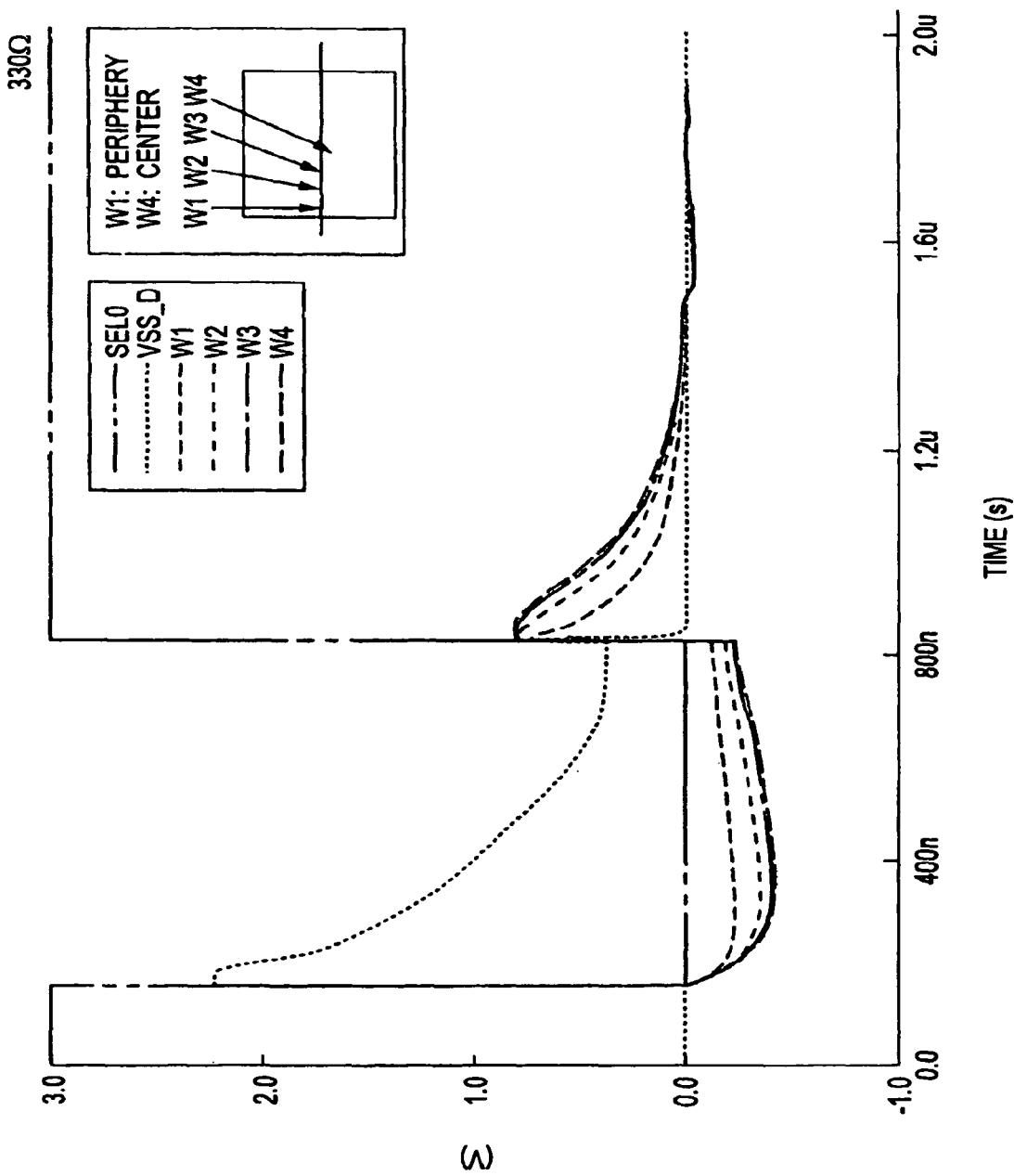
FIG. 9 is a figure showing a result of reproducing P-well fluctuation by simulation (control resistance 146=330Ω)
Figure 10:
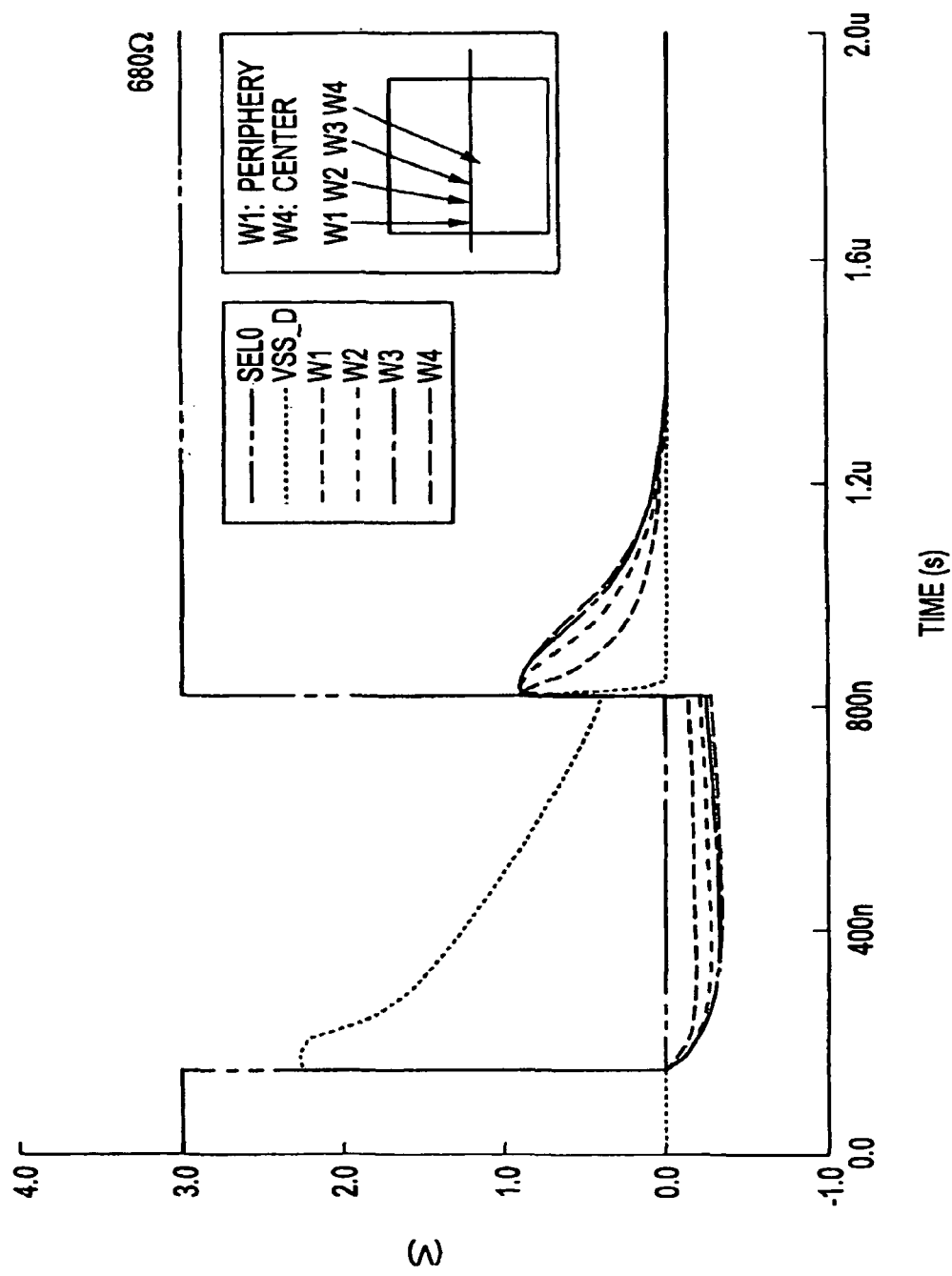
FIG. 10 is a figure showing a result of reproducing P-well fluctuation by simulation (control resistance 146=680Ω)

The unit pixel 3, although omitted of showing in detail, is configured similarly to the three-transistor structure shown in FIG. 9B concerning the prior art. The drain line 57 is common between almost all the pixels of the pixel section 10, which is an interconnection extending in the column direction to have a common end at the end of the pixel 10 or in a grid form opened by a hole over a charge generating part 32. The pixels may pertly include those the drain line 57 is separated, e.g. dummy pixels. Meanwhile, around the pixel 10, there is provided an interconnection and contact for providing a potential to the P-well though omitted of showing.

Because the drain line 57 is connected to almost all of or all the pixels, potential fluctuation occurs on the P-well of the pixel 10 when switching the drain line 57 over to the low. Because there is difference in fluctuation amount and time between at the periphery and at the center, there is at the center an increase of the leak charge from the charge generating part 32, to decrease saturation signal charge at the center. Namely, as explained in the prior art, unless measure is taken, the first problem is encountered, i.e. the characteristic differs between the pixels at the periphery and at the center.

FIGS. 2 to 10 explains the first problem as well as the first technique as a countermeasure approach to the same. At first, FIG. 2 explains concretely the first problem (saturation shading phenomenon). The device uses a CMOS sensor conforming to the VGA rating on approximately 0.3 million pixels (640×480 pixels). The unit pixel 3 is the three-transistor structure as shown in the second example in the prior art, having a pixel pitch of 4.1 μm. Note that VGA is an abbreviation of "Video Graphics Array" that defines graphics modes and display resolutions.

The power voltage to be supplied to a trial-manufactured device is assumably 3.0 V with a clock frequency of 6 MHz (frame rate 13.3 fps). The trial-manufactured device is made to variably change the low level of transfer gate drive voltage (hereinafter, referred also as transfer-gate low level). Furthermore, it has a terminal DRNL (ground-sided terminal of the DRN drive buffer) for supplying a low level potential (0 V, herein) to the drain line 57. The other driving to the unit pixel 3 is on 0 V (ground: GND) and a power voltage (3.0 V).

Figures 2A, 2B:
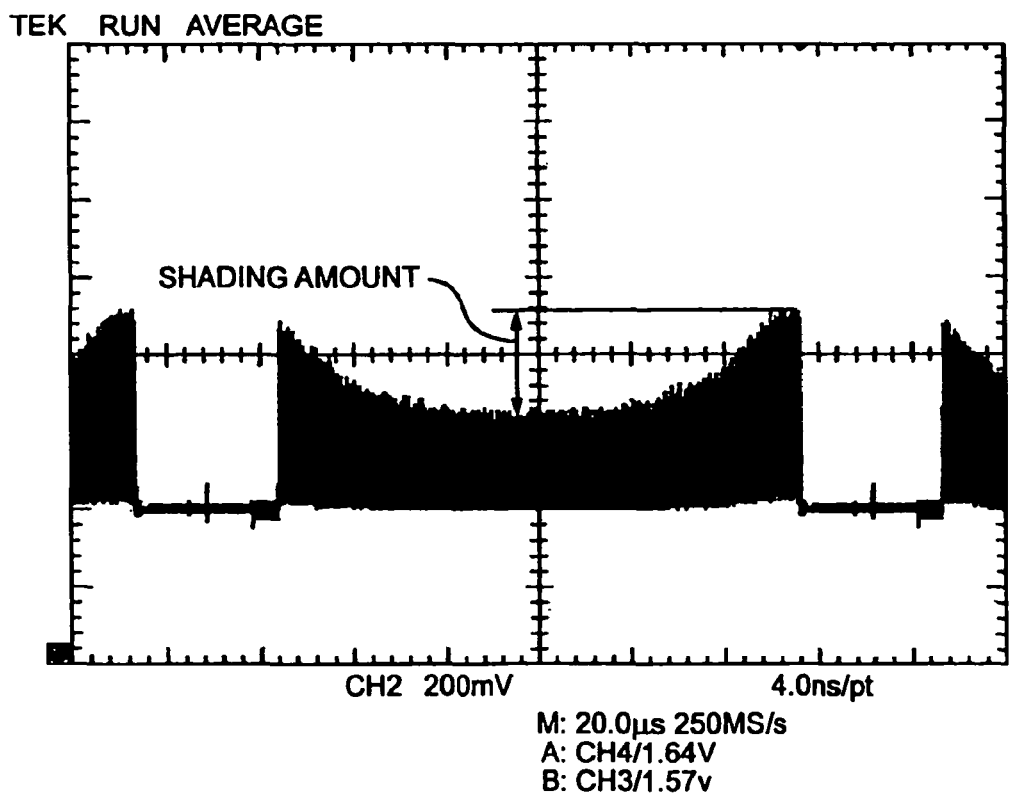
FIG. 2 is a figure explaining saturation shading phenomenon.

In the measuring method for saturation shading, while radiation is applied in an amount to fully cause saturation in the charge generating part, the signal obtained in the output buffer 28 was measured, as a shading amount, a difference between at the periphery and at the center by observing one line nearby a screen center by means of a waveform monitor such as an oscilloscope. As shown in FIG. 2, on the trial-manufactured device used in verification, a great difference is observed between at the periphery and at the center. It can be seen that signal output is smaller at the center than that at the periphery.

Figure 3:
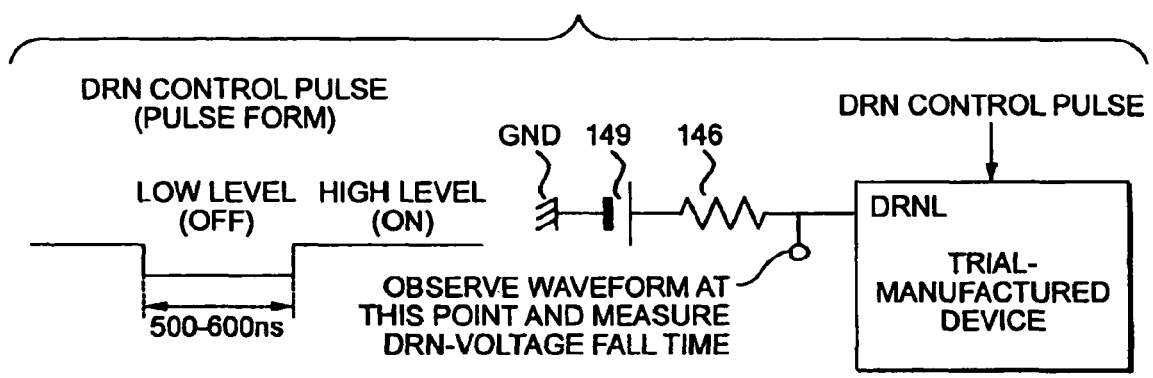
FIG. 3 is a figure showing a measuring circuit for examining a voltage change on the drain line.

FIG. 3 shows a measuring circuit for examining a voltage change on the drain line 57. A control resistance 146 was inserted between the ground-sided terminal DRNL of the DRN drive buffer 140 as a trial-manufactured device and the GND, to measure a voltage across the control resistance 146. The voltage source 149 was at 0 V. Incidentally, the DRN drive buffer 140 is provided within the vertical drive circuit 14b of the vertical scanning circuit 14.

When a DRN control pulse (pulse-formed DRN control signal) is inputted to the DRN drive buffer 140 (not shown) of the trial-manufactured device, the voltage waveform measured on the control resistance 146 reflects a waveform of the current flowing the DRN drive buffer 140, representing also a voltage waveform on the drain line 57. Note that the control resistance 146 closely relates to the second example of improvement technique based on the first approach while the voltage source 149 to the improvement technique based on the second approach.

FIG. 4 shows a relationship between resistance value and saturation shading in the case the control resistance 146 is inserted between the ground-sided terminal DRNL and the GND to thereby blunt the DRN control pulse. In the figure, the low level voltage at the transfer gate is shown by Vtl. The resistance values used in measurement were 1, 10, 47, 150, 330, 680 and 1000 (unit: Ω) conforming to the E12 system.

Figure 4A:
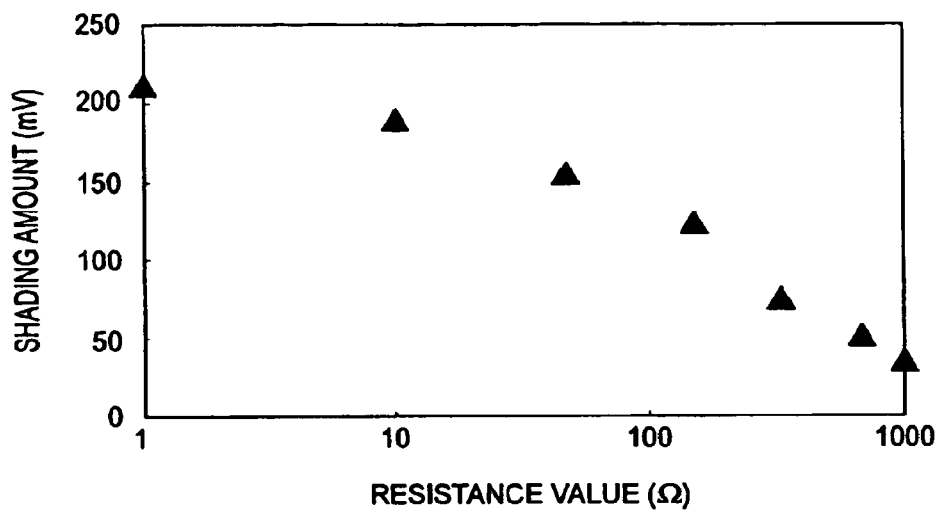
FIG. 4 is a figure showing a relationship between resistance value and saturation shading when the DRN control pulse is blunted.

As shown in FIG. 4A, at Vtl=−0.6 V, saturation shading less changes in a range of 1-10Ω wherein a sign of change in saturation shading is seen at around 10Ω and greater. A great change is observed at 50Ω and greater. Namely, in case the control resistance 146 has a value smaller than approximately 10Ω, there is no affection upon the device in the present situation. Meanwhile, if it is increased to approximately 10Ω or greater, there is obtained an effect to reduce saturation shading. At 50Ω or greater, significant effect is obtainable.

Figure 4B:
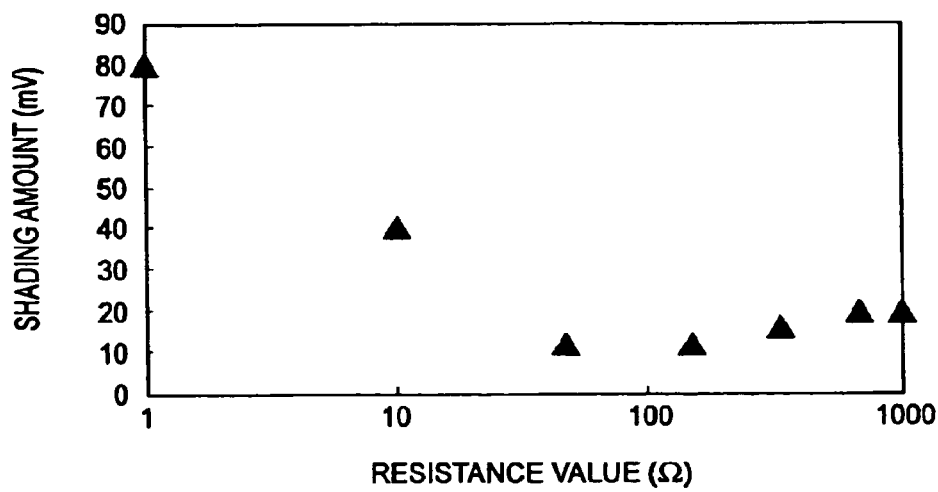

Meanwhile, as shown in FIG. 4B, at Vtl=−1 V, a great change in saturation shading is observed also in the range of 1-10Ω. It reaches the minimum in a range of 50-200Ω. In the higher range than that (e.g. 200Ω-nearly 1000Ω), there is a tendency toward the somewhat increase of saturation shading. Namely, there is observed a significant effect to reduce saturation shading at a resistance value of approximately 10Ω or greater of the control resistance 146. It is considered best at around 50-200 Ω.

FIG. 5 is the result shown in FIG. 4 shown as a relationship between voltage-waveform fall time (off transition time) and saturation shading at the control resistance 146. The drive pulse form for the CMOS sensor is usually set with a fall and rise time (on transition time) of several ns (e.g. 1-3 ns) on any of those on the transfer line 55, the reset line 56 and the drain line 57. Accordingly, in case the voltage waveform fall and rise time appears of nearly several ns or smaller on the control resistance 146, it may be considered the device is being driven generally under the usual condition.

Figure 5A:
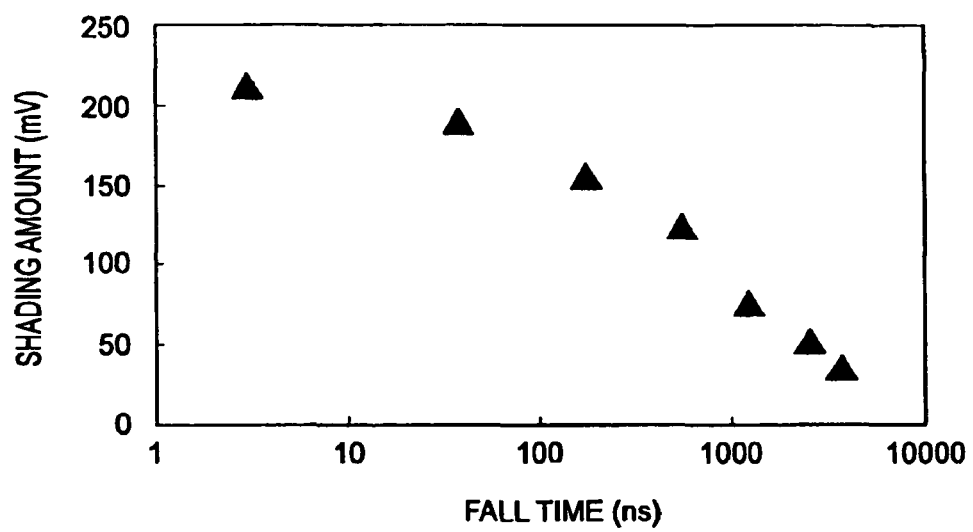
FIG. 5 is a figure showing the result shown in FIG. 4 as a relationship between voltage-waveform fall time on the control resistance and saturation shading.

As shown in FIG. 5A, at Vtl=−0.6V, saturation shading less changes up to a fall time of 10 ns (equal to or nearly 3-10 times greater than the usual) corresponding to the range of 1-10Ω. A sign of change is seen at around 10 ns corresponding to approximately 10Ω. A great change is observed at 40 ns and greater corresponding to approximately 50Ω. Namely, if noticing the fall time, there is no affection upon the device in the present situation at around 10 ns or smaller. Also, at greater than nearly 10 ns, there is obtained an effect to reduce saturation shading. At 40 ns or greater, significant effect is obtainable. This effect is sustained up to a fall time of 10000 ns (equal to or smaller than nearly 3000-10000 times the usual).

Figure 5B:
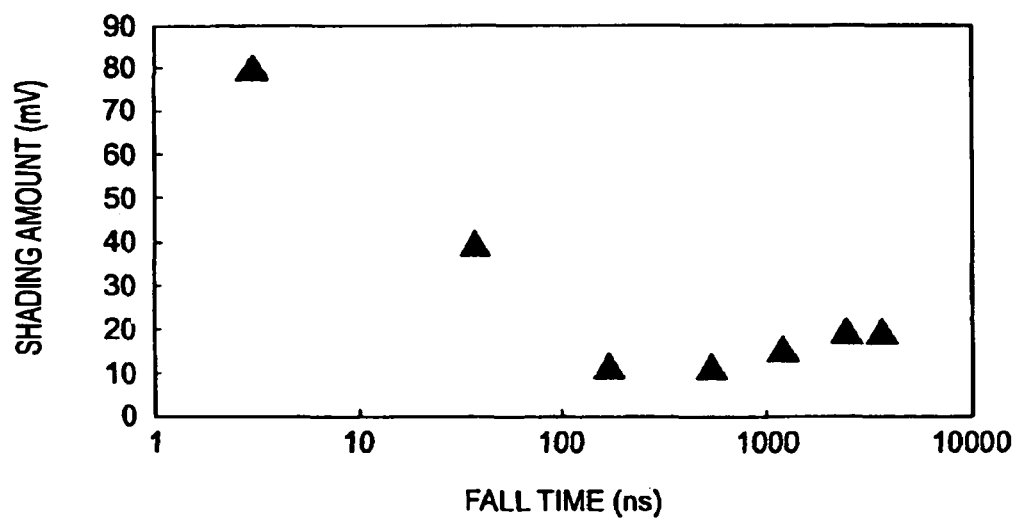

Meanwhile, as shown in FIG. 5B, at Vtl=−1 V, a great change in saturation shading is observed also in a range of 10-40 ns. At a fall time of 40 ns (nearly 13-20 times greater than the usual) or greater, a significant effect is seen. Particularly, saturation shading reaches the least in a range of 170-600-1000 ns (nearly 56-1000 times greater than the usual) corresponding to a resistance value of nearly 50-200Ω. In the greater range than that (e.g. up to 1000-5000 ns, nearly 330-5000 times greater than the usual), there is a tendency toward a somewhat increase of saturation shading. Namely, saturation shading can be improved by blunting the DRN voltage. At a fall time of nearly 40 ns or greater, observed is a significant effect to reduce the saturation shading. It can be considered best at nearly 170-600 ns (e.g. approximately 56-600 times greater than the usual).

In this manner, effective range differs depending upon the low level voltage Vtl. However, saturation shading can be improved by blunting the DRN voltage in a range of off transition time (fall time in this embodiment) of from 3-10 (nearly 5 times in average) times to 10000 (ten thousands) times that of the usual, preferably in a range of nearly 50-600 times.

Figure 6:
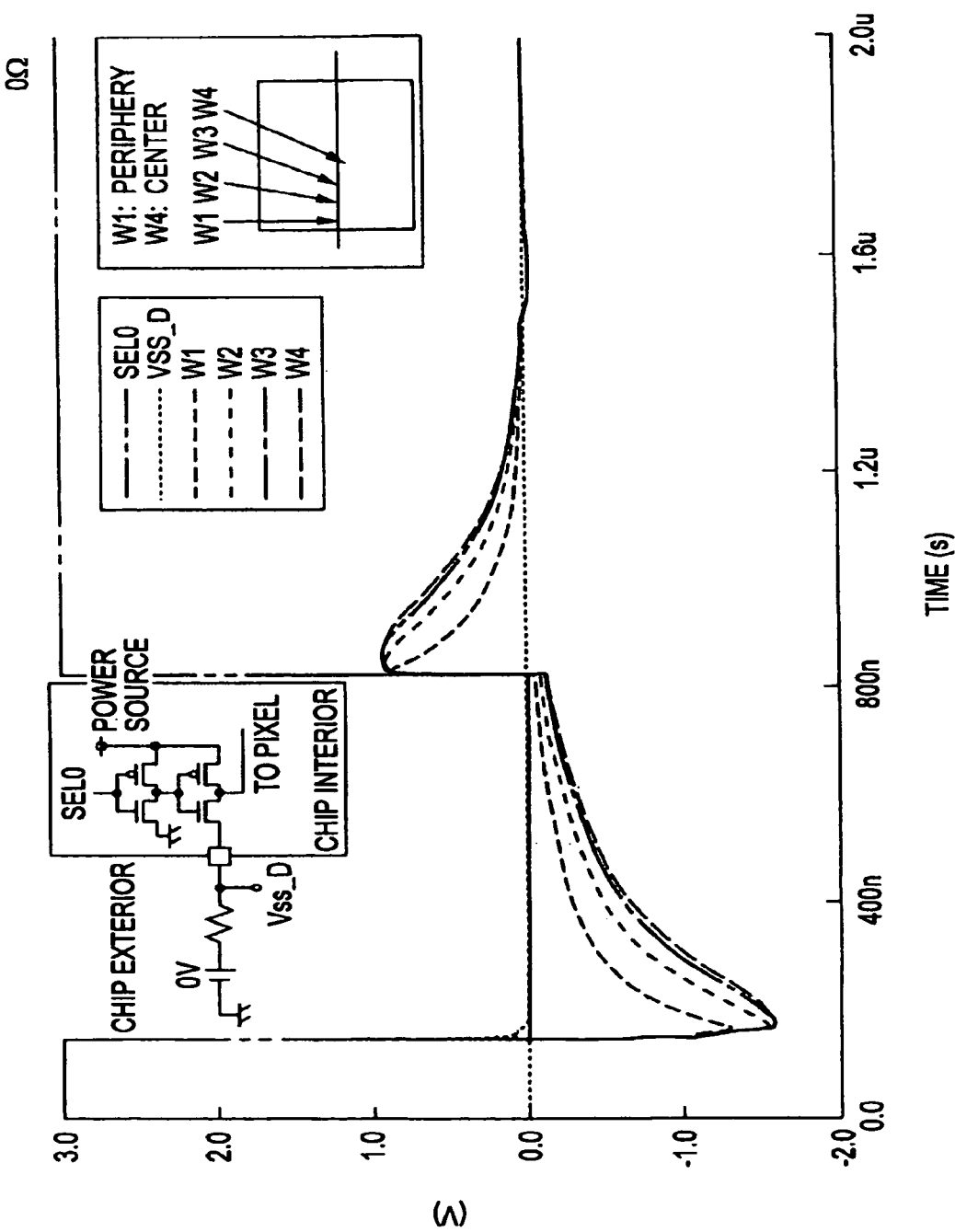
FIG. 6 is a figure showing a result of reproducing P-well fluctuation by simulation (control resistance 146=0Ω)
Figure 7:
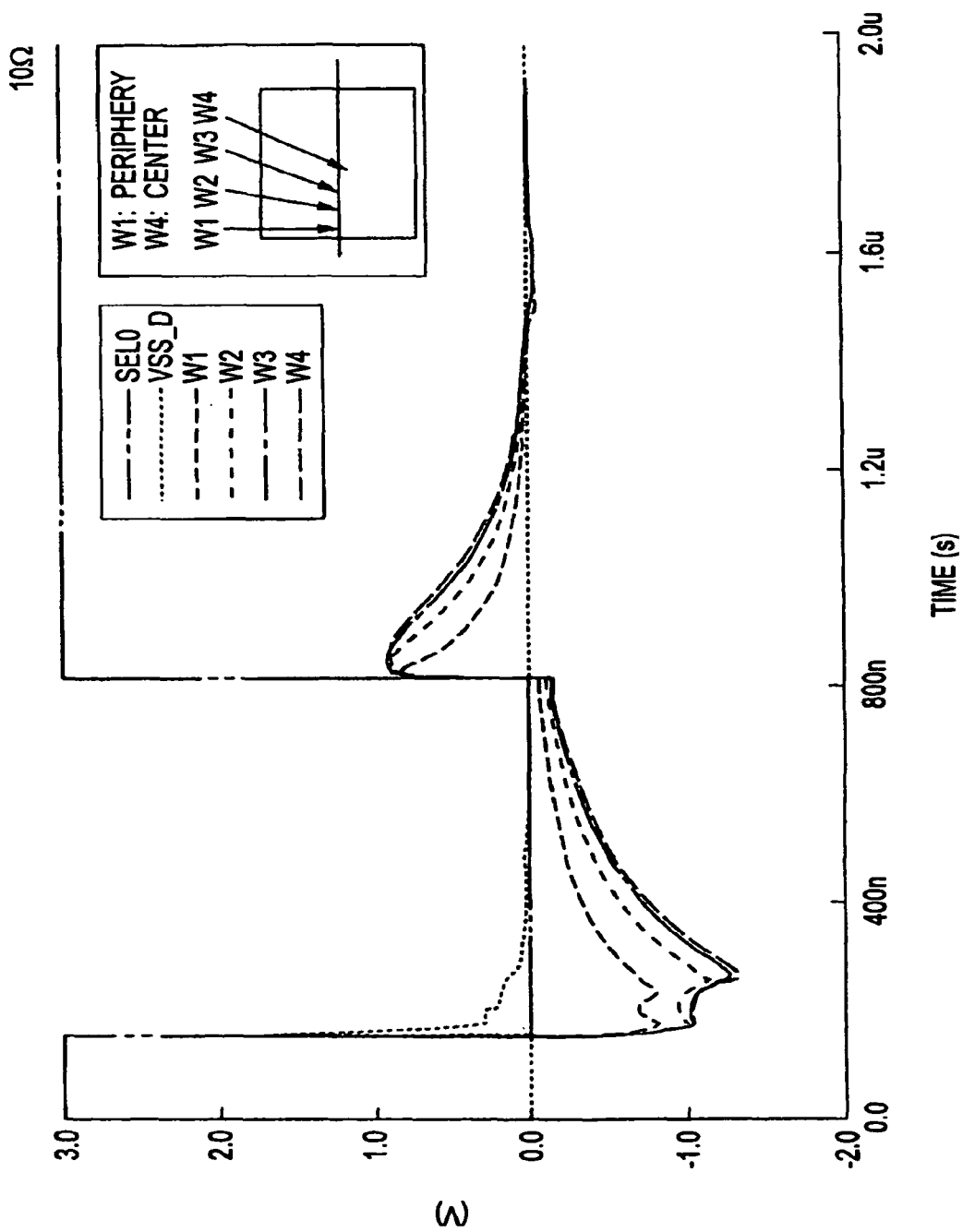
FIG. 7 is a figure showing a result of reproducing P-well fluctuation by simulation (control resistance 146=10Ω)
Figure 8:
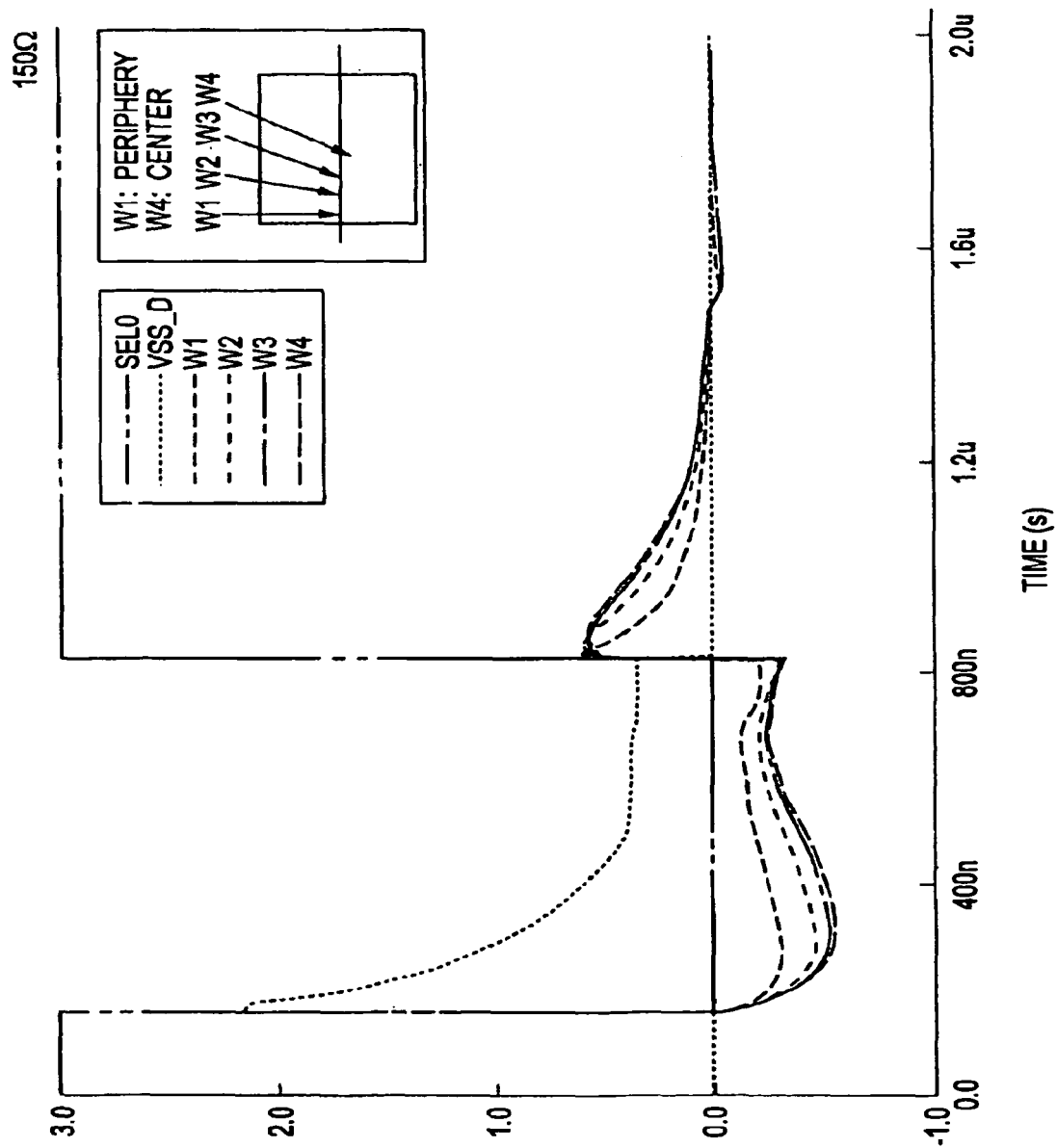
FIG. 8 is a figure showing a result of reproducing P-well fluctuation by simulation (control resistance 146=150Ω)

FIGS. 6 to 10 show a result of the P-well potential fluctuation reproduced by simulation. These figures are shown based on the value of control resistance 146. Incidentally, the reason of showing a simulation result here is because of the difficulty in actually measuring a P-well potential fluctuation. The waveform lines W1-W4 in the figure are at respective device positions shown in the figure. Meanwhile, as shown in FIG. 6, the waveform line SEL_0 represents a characteristic on the DRN pulse while the waveform line VSS_D is a characteristic at the terminal measured in the experiment.

As is shown, it can be seen that, when the value of control resistance 146 is increased, the fall time of DRN voltage increases on the drain line 57, to decrease the P-well potential fluctuation and also decrease the difference between at the center and at the periphery. Namely, increasing the value of control resistance 146 and the fall time of DRN voltage leads to a characteristic uniform on the peripheral pixel and on the center pixel. It can be seen that this is highly effective for improving the saturation shading.

The present embodiment has an arrangement for improving saturation shading by blunting the DRN voltage on the basis of the above analysis result, as an improvement technique based on the first approach for eliminating the first problem (saturation shading phenomenon). Specifically, a contrivance is provided for improving the saturation shading phenomenon by taking control of the fall time during switching the drain line 57 over to the low. Briefly explaining the contrivance, employed is a drive method of increasing the fall time to allow slow rise when switching the drain line 57 over to the low. This can reduce the amplitude of P-well potential fluctuation or decrease the P-well potential difference between at the periphery and at the center of the pixel region 10. In the present embodiment arrangement, the fall time is significantly (intentionally) increased greater than that of the usual driving technique.

Concerning the definition technique for increasing the fall time greater than that in the usual driving technique, various definition techniques can be considered including a method of regulation with a percentage (multiple) to a drive pulse fall time in the usual drive technique, a method of regulation with a ratio of fall time corresponding to the number of pixels (specifically, drive period), or a technique of defining a time the potential difference between at the periphery and at the center of the P-well is equal to or smaller than a predetermined level (in level image quality deterioration is not conspicuous).

Meanwhile, in the case of regulation by means of a percentage (multiple) to a drive pulse fall time in the usual drive technique, regulation may be by a comparison with the other drive pulse without limited to the comparison with the DRN-voltage fall time in the own's usual driving. For example, the buffer for driving the line may be determined in its size such that DRN-voltage fall time is a predetermined multiple or more longer than a fall time of any of the transfer and reset lines.

Meanwhile, the restoration operation of a selected pixel to a non-selected state is made by reducing the DRN control pulse to a low level during the blanking period. In the case of regulation by means of a fall time percentage corresponding to the drive period, how to define the maximum value is problematic. It is preferred to define the maximum value by a low-level period of DRN control pulse for example, and to define an actual fall time within the range thereof. With the CMOS sensor of the present experiment, the DRN control pulse has a low level period (i.e. off period on the drain line 57) set at approximately 600 ns.

Incidentally, the above is not to exclude the setting of a fall time equal to or greater than the off period on the drain line 57. In the present experiment, the fall time of equal to or greater than 600 ns was determined from an extrapolation curve of measurement data. In this case, it is required to attain a low voltage for restoring the selected pixel to a non-selected state.

In any case, there has been found the problem that characteristic is different between the pixels at the periphery and at the center, which is responsible for the P-well potential difference. In order to eliminate the problem, the improvement technique based on the first approach is characterized in that a fall time is set to a level at which the image-quality deterioration (saturation shading phenomenon) resulting from a P-well potential difference is not conspicuous.

For example, based on the result shown in FIGS. 2 to 10, based on the result shown in FIGS. 2 to 10, a fall time is provided 10 times or more longer than a fall time of each of the transfer pulse TRF and reset pulse RST as the other pulses for the pixel region 10. For example, although the pulse form in the other section of the CMOS sensor has a fall time of nearly several ns, this is made such that the DRN voltage on the drain line 57 is greater than 40 ns (nanoseconds). This 40 ns is a half duration of the pixel clock period when an image is outputted at 30 frames per second from the CMOS sensor at VGA (approximately 0.3 million pixels). Although here is shown the case with the CMOS sensor conforming to VGA, it is considered that those having other display resolutions are applicable provided that they are greater than a half duration or more of the pixel clock period.

Where display resolution, or total pixel count, is different, naturally the absolute value of fall time is also different correspondingly. Incidentally, fall time may be on the general definition, i.e. transition time of from 90 to 10 provided that the high level is taken 100 while the low level is 0. In the below, explanation is made on a concrete case of an improvement technique based on the first approach for eliminating the foregoing saturation shading problem.

<Improvement Technique Based on the First Approach: First Example>

FIG. 11 explains a first example of a method for controlling a fall time (fall-time control method) of the drive voltage to be applied to the drain line 57. Here, FIG. 11A is a concept view noticing the circuit for driving the drain line 57, FIG. 11B is a diagram showing a detailed example of the DRN drive buffer (hereinafter, referred merely to as buffer) 140 to drive the drain line 57, and FIG. 11C is a figure showing one example of drive timing.

As shown in FIG. 11A, the drain line 57 extend in the column direction correspondingly to the column of the pixel region 10, to have a lower end connected to an output terminal of the DRN drive buffer (hereinafter, referred merely to as buffer) 140. The buffers 140 are provided on the respective columns, to which a control pulse (DRN control pulse) for driving the drain line 57 is applied externally of the pixel region 10. In response, the buffers 140 equally drive the drain lines 57 on the columns. Namely, the drain line 57 on each column is common on all the pixels.

As shown in FIG. 11B, the buffer 140 on the drain line 57 is configured using two stages of CMOS type inverters 142, 144. The inverters 142, 144 are configured by an NMOS transistor shown at reference-a and a PMOS transistor shown at reference-b, respectively. The both transistors collectively are also called a buffer transistor. Here, usually the final-staged inverter 144 connected to the drain line 57 has an increased buffer-transistor W/L ratio (W: gate width, L: gate length), not to increase the both of rise time and fall time. For example, as shown in FIG. 11A, for a pixel-count VGA class on the arrangement having buffers 140 on the columns of drain lines 57, fall time is provided several ns or less. Consequently, the buffer final-staged NMOS transistor 144a is conventionally set with a W/L ratio of, for example, approximately 5-10/0.6 (typically 10/0.6).

On the contrary, in the arrangement of the first fall-time control method, the buffer transistor W/L ratio is made smaller than that of the usual (conventional) arrangement thereby positively (intentionally) increasing fall time. Particularly, fall time is intentionally increased without increasing the W/L ratio of the NMOS transistor 144a. For example, as contrasted with the foregoing (pixel-count VGA class in the FIG. 11A arrangement), setting is preferably at nearly 1/0.6-1/20.

Namely, setting is made significantly small relative to that of the conventional arrangement. For example, in the above example, setting is preferably in a range of nearly 1/10-1/320 in terms of the usual ratio. Naturally, this is a mere one example, wherein setting is preferably at least in a range of nearly 1/5-1/500.

Incidentally, definition herein was in comparison with the buffer final-staged W/L ratio in the conventional arrangement. However, because the transistors for driving the transfer line (read select line) 55 in the unit pixel 3 and reset line 56 must be made several ns or less in rise or fall time, the foregoing numerical relationship is true for in comparison with the W/L ratio of those. Namely, the transistor connected to the drain line 57 preferably has a W/L ratio set in a range of 1/5-1/500, preferably in a range of nearly 1/10-1/320, relative to the W/L ratio of any of the transistor connected to the transfer line 55 and the transistor connected to the reset line 56. In the usual design, there is no possibility to set the buffer final-staged W/L ratio at such a small value.

By doing so, as shown in FIG. 1C, although the DRN control pulse to be applied to the buffer 140 has a fall time of nearly several ns or less, the DRN voltage outputted from the buffer 140 and driving the drain line 57 has a pulse form having a fall time of 40 ns or greater. This can solve the problem that saturation electrons are less at the center of the pixel region 10, reduce the P-well potential difference down to the practical level, and improve the image-quality deterioration of saturation shading.

Incidentally, there is no affection of saturation electrons upon the rise side. However, this is similar to the fall in that potential fluctuation occurs in the P-well and moreover this is different between at the periphery and at the center. Meanwhile, although not confirmed on the trial manufacture by the present inventors, where there is a low-voltage N-type diffusion layer within the pixel, it acts as a P-well and forward bias. There is a fear that electrons injected into the P-well are to enter the charge generating part 32. Accordingly, the buffer final-staged (i.e. inverter 144) PMOS is preferably fabricated small to make also the rise slow if time is available. However, because pixel signal current flows at the high level of the drain line 57, there is a need for such a degree as not to cause a problematic voltage reduction.

<Improvement Technique Based on the First Approach: Modification to the First Example>

FIG. 12 is a figure explaining a modification to the technique for realizing the first example of fall-time control method. Here, FIG. 12A is a concept view noticing the circuit to drive the drain line 57, FIG. 12B is a figure showing a detailed example of a DRN drive buffer 140 for driving the drain line 57, and FIG. 12C is a chart of the W/L ratio based on the first example of fall-time control method arranged in comparison with the prior art.

As shown in FIG. 12A, this modification is characterized in that the drain line 57 is driven laterally of the pixel region 10. The pixel region 10 has left and right ends connected with output terminals of the buffers 140. The drain line 57 is a grate-formed interconnection opened by a hole over a photodiode (charge generating part 32). The buffers 140 are provided on the respective rows. The buffers 140 drive equally the drain lines 57 on the rows, according to a DRN control pulse of from the external of the pixel region 10. Incidentally, herein, explicitly drawn a buffer final-staged lower power-source line, i.e. only a source terminal of an NMOS transistor 144b. This line is made as a GND line, as shown in FIG. 12B.

In this manner, for the arrangement the drain lines 57 are to be laterally driven wherein fall time is given several ns or less for the pixel-count VGA class, fall time is provided several ns or less. Conventionally, the buffer final-staged NMOS transistor 144*b* has a W/L ratio set, for example, at nearly 5-10/0.6 (typically 6/0.6), similarly to the arrangement having the buffers 140 on the columns.

On the contrary, this modification sets the NMOS transistor 144*b* with a W/L ratio at nearly 1/1-1/20. Namely, setting is preferably in a range of nearly 1/10-1/200, relative to that of the conventional arrangement (in the usual ratio). Naturally, this is mere one example, e.g. setting is preferably at least nearly 1/5 or less to 1/300 or less.

In the usual design, there is no possibility to set the buffer final-staged W/L ratio at such a small value. By doing so, the pulse form for driving the drain line 57 is given a fall time of 40 ns or greater, similarly to the showing in FIG. 11C. This makes it possible to enjoy the similar effect to that of the arrangement having buffers 140 on the columns.

Incidentally, the first example of fall-time control method can adopt an arrangement that the drain lines 57 over the pixel-region entire surface are to be driven by one DRN drive buffer 140, besides the arrangements shown in FIGS. 11A and 12A. This arrangement, although not to be practically employed in the usual design, can be adopted in the present first example. In this case, when adopting the conventional contrivance with a fall time of several ns or less, the buffer final-staged NMOS is set with a W/L ratio of approximately 5000/0.6, for example. On the contrary, in the case that the contrivance based on the present first example is employed, a fall time is provided 40 ns or greater by setting the W/L ratio of the NMOS transistor 144*b* at nearly 500/0.6-2/0.6 (in a range of nearly 1/10-1/2500 in terms of the usual ratio).

As explained above, according to the first example of fall-time control method, the transistor configuring the buffer for driving the drain line 57 has a W/L ratio set smaller than that of the usual (conventional) arrangement. This can positively (intentionally) increase the fall time on the drive voltage. Due to this, even on the three-transistor type of pixel structure not having a select transistor, it is possible to prevent the reduction of saturation electrons at the center of the pixel region due to potential fluctuations in the well. As a result, it is possible to reduce the image-quality deterioration resulting from P-well potential difference to a level not practically conspicuous, thus improving image quality.

<Improvement Technique Based on the First Approach: Second Example>

FIG. 13 explains a second example of fall-time control method. Here, FIG. 13A is a concept view noticing the circuit for driving the drain line 57 while FIGS. 13B, 13C and 13D show modifications to the second example.

The second example technique is characterized in that the resistance elements for limiting the drive current are inserted between a lower power line (off reference line) of the drain line 57 and buffer 140 (particularly buffer final stage) for driving the same and a low-level voltage source (reference power source defining an off voltage for the drain line 57, including GND).

The drive circuit has a basic arrangement same as that of the first modification shown in FIG. 12A. The difference lies in that the buffer final-staged lower power line, i.e. source terminal of the NMOS transistor 144*b* of the inverter 144, shown explicitly extended is not directly connected to the GND line but connected to the GND line through the control resistance 146.

Meanwhile, the figure conveniently shows the final-staged lower power line straightly extended for the buffers 140 on the vertical one column. Also, although omitted of showing, the DRN drive buffer 140 for driving the drain line 57 is similar in detail to that of the first modification shown in FIG. 12B. The second example technique is similarly applicable to the arrangement shown in FIG. 11A and arrangement for driving the drain lines over the pixel region entirety by one DRN drive buffer.

According to the second example technique, even in case the buffer transistor W/L ratio is given great as in the usual, the use of the control resistance 146 can increase the fall time during switching the drain line 57 over to the low, similarly to the first example technique. Accordingly, this can enjoy the effect to improve saturation shading, similarly to the first example technique.

In the technique of adjusting only the transistor W/L ratio as in the first example technique, the W/L ratio if determined in design is not to be modified easily. On the contrary, with the second technique, resistance value can be changed by merely changing only one fabrication mask. Otherwise, it is possible to take an arrangement that, as shown as a modification in FIG. 13B, a plurality of resistance elements are previously provided (resistance switchover circuit) so that a resistance element can be selected by an internal program (may be selected in a desired combination). In this case, it is very easy to change resistance value. Incidentally, the control resistance 146 and the resistance switchover circuit may be provided outside the device.

As can be seen from the device analysis shown in FIGS. 2 to 10, the experiment gives a preferred result not problematic in operation speed while preventing the reduction of saturation electrons at the pixel-region center where control resistance 146 uses a value of approximately 50-200Ω at a pixel count of VGA class. The modification shown in FIG. 13B if applied can conveniently find a suitable value under actual device conditions and set such a suitable resistance value.

Incidentally, the second example technique is not limited to the application to the construction shown in FIG. 13, i.e. the device shown in FIG. 12A but to the device shown in FIG. 11A similarly. Meanwhile, the arrangement is not limited the insertion of the control resistance 146 at one point to the GND, but may insert it together with the buffer 140. In this case, the arrangement may be by an insertion to between the ground-sided line terminal of each buffer 140 and the GND as shown in FIG. 13C, by an insertion to the output side of each buffer 140 as shown in FIG. 13D, or in a combination of these. The arrangement of FIG. 13D is effective in moderating not only the fall but also the rise. The arrangement of insertion to the source side of each buffer 140 is to distribute the control resistance 146 to the buffers 140, which is substantially equivalent to the arrangement shown in FIG. 13A.

<Improvement Technique Based on the First Approach: Third Example>

FIG. 14 explains a third example of fall-time control method. Here, FIG. 14A is a concept view noticing the circuit for driving the drain line 57 while FIG. 14B shows one example of drive timing.

The third example is characterized in that a current source for regulating the drive current is inserted between a lower power line (off reference line) of the drain line 57 and buffer 140 (particularly buffer final stage) for driving the same and a low-level voltage source (reference power source regulating an off voltage for the drain line 57, including GND). Specifically, the control resistances 146 used in the second example technique are replaced with a current source 148. This arrangement is equivalent to an arrangement that the low-level voltage source (corresponding to the voltage source 149 shown in FIG. 3) is replaced with the GND. The third example technique is applicable similarly to the arrangement shown in FIG. 11A or the arrangement of driving all the drain lines on the pixel-region entire surface by one DRN drive buffer.

The fall time over the drain line 57 can be controlled on the current under control of the current source 148. The current source 148 may be configured by inserting one N-type transistor or by current control by means of a current mirror. In brief, it is satisfactory to maintain a current flow nearly constant. Various configurations are applicable. By regulating the driving current value, the foregoing condition can be satisfied and setting is possible to the optimal state reduced in saturation shading. With the set current variable in value, the configuration is provided more preferable. The constant current source is the usual one as in the above. No constant current is allowed to flow at around 0 V. In FIG. 14B, the curve is moderated to settle at 0V.

In the foregoing first and second example technique, DRN potential (output voltage of buffer 140) suddenly drops initially of fall, as shown in FIG. 11C. On the contrary, the third example technique suppresses (regulates) DRN potential from suddenly dropping over the entire duration of fall. Accordingly, similarly to the first and second example technique, it is possible to increase the fall time during switching the drain line 57 over to the low. Thus, the effect to improve saturation shading can be enjoyed.

<Improvement Technique Based on the Second Approach>

Now a second approach for saturation-shading improvement is explained from a viewpoint different from the improvement technique based on the first approach shown in the first to third examples.

FIG. 15 shows a relationship between transfer-gate low level and saturation shading. The measurement condition is under that the control resistance 146 has a resistance value of 0Ω (ground-sided terminal DRNL is connected to the GND without providing the control resistances 146).

Figure 15A:
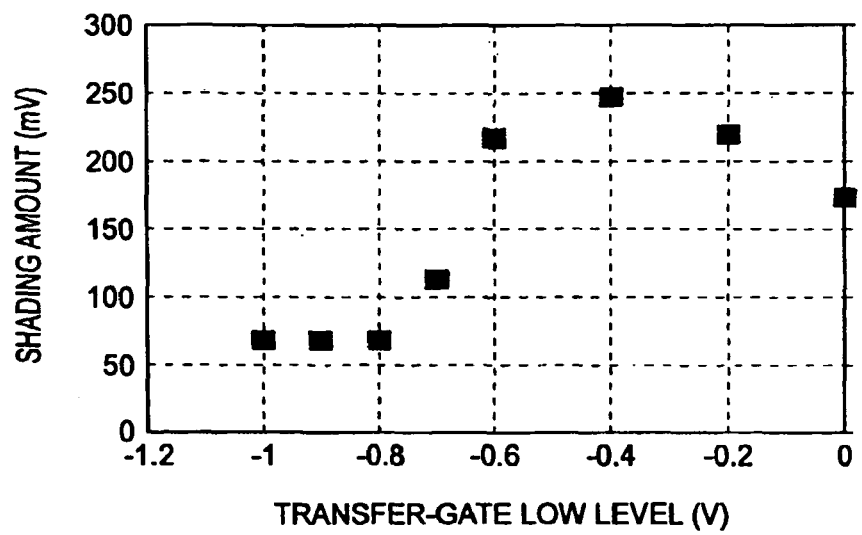
FIG. 15 is a figure showing a relationship between transfer gate low level and saturation shading.
Figure 15B:
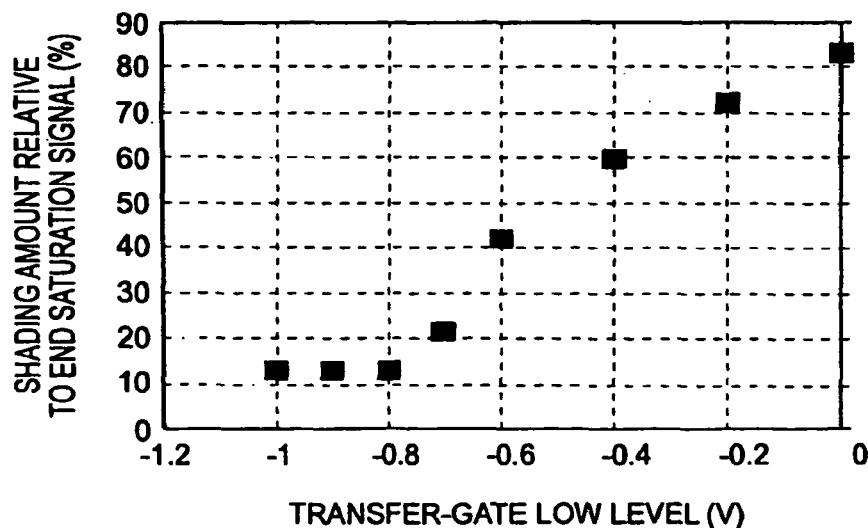

As shown in FIG. 15A, it can be seen that the absolute value of saturation shading decreases at a transfer gate level of approximately −0.7 V and smaller. Meanwhile, as shown in FIG. 15B, the shading amount relative to an end saturation signal, i.e. the ratio of shading, decreases when the transfer-gate low level is given negative. It can be seen that it reaches constant at approximately −0.8 V.

The improve technique based on the second approach, noticing this point, uses an arrangement allowing a transfer-gate low level to set a negative voltage for forming a potential barrier against the charge leak from the charge generating section 32 to the floating diffusion 38 (charge storage point).

Figure 16:
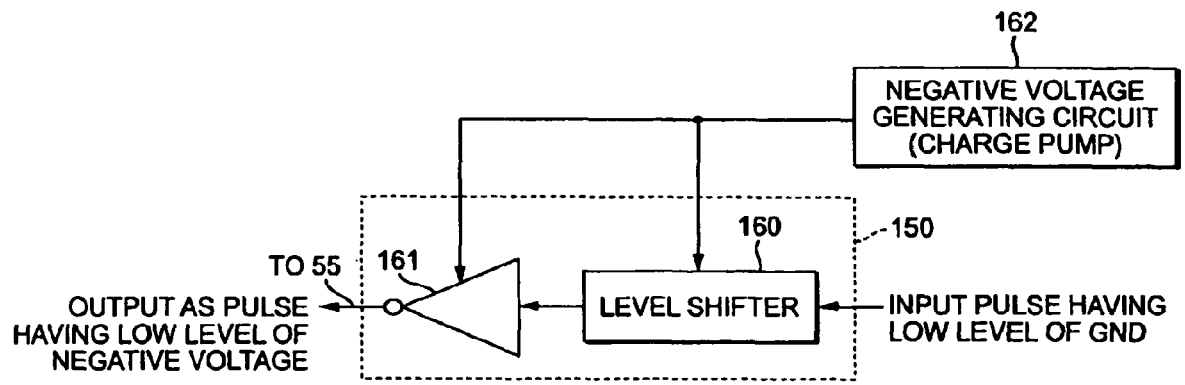
FIG. 16 is a figure explaining an improvement technique based on the second approach.

FIG. 16 explains an improvement technique based on the second approach. The transfer drive buffer 150, already mentioned in FIG. 19B, has a level shifter 160 and an output buffer 161, to output an input pulse having a low level GND as a pulse having a low level in negative voltage. The negative voltage is supplied from an incorporated negative-voltage generating circuit 162. The negative-voltage generating circuit 162 may be a usual charge pump circuit. Naturally, a negative voltage may be supplied from the external instead of incorporating the negative-voltage generating circuit 162.

By making negative the low level (Vtl) of the transfer transistor gate voltage, saturation electrons can be suppressed from decreasing at the pixel-region center. This is because, by making negative the low level voltage Vtl, the potential barrier can be heightened against the charge leak from the charge generating section 32 to the floating diffusion 38. Note that the maximum value in minus is given in such a degree as not to cause breakdown on the device.

As was shown in FIG. 15, according to the experiment, the ratio of shading relative to saturation signal amount is decreased by making the low level voltage Vtl negative. This technique is allowed to work independently of the improvement technique based on the first approach for blunting the DRN voltage shown in the first to third examples. As can be seen from FIG. 15, the arrangement is made further preferable by a variable setting voltage value.

The relationship figure of between low level voltage Vtl and saturation shading, shown in FIG. 15, was to observe the effect of low level voltage Vtl without blunting the potential on the drain line 57. In this figure, the absolute value of shading amount is smaller than 0 V at −0.7 V or smaller. At −0.8 V or smaller, both saturation signal amount and shading amount are constant. This is because, at −0.8 V or smaller, a hole channel reverse in polarity to signal charge is caused at an Si-oxide film interface (Si-semiconductor interface) constituting the unit pixel 3 whereby, even if the low level voltage Vtl is lowered furthermore, there is merely a change of hole concentration in the channel without causing a change in bulk state. Such phenomenon is called pinning phenomenon. Accordingly, if based on the above experiment, it is preferred to set the voltage source 149 with an output voltage of approximately −0.7 V or smaller. More preferably, it is desired to provide a sufficient value (e.g. approximately −0.8 V) or smaller for causing a hole channel at the semiconductor interface.

Incidentally, the present inventors have proposed, in JP-A-2001-6657, a technology that the low level voltage Vtl is made as a negative voltage, for the unit pixel 3 structured with four transistors including a select transistor. In this respect, this is common to the technique described in the fourth example. However, the technique in JP-A-2001-6657 aims at reducing dark current whereas the forth example technique aims at suppressing the phenomenon that saturation voltage decreases at the center of the pixel region 10 for the unit pixel 3 consisting of 3 transistors. Thus, the objects are different from each other. Namely, the phenomenon handled by the fourth example technique is unique to pixel selection through the reset transistor 36 by switching the DRN potential wherein the unit pixel 3 does not include a select transistor connected in series to an amplifier transistor 42. The fourth example structure can suppress the saturation-shading problem unique to the three-transistor structure by making negative the low level voltage Vtl to the unit pixel 3.

<Improvement Technique Based on the Third Approach>

Now, explained is an improvement technique based on a third approach. The third approach is characterized in an arrangement that the unit pixel 3 has an interconnection for fixing well potential. Specifically, the well potential is fixed by the use of a bias interconnection and contact (well contact) for providing a potential to the P-well.

Figure 17:
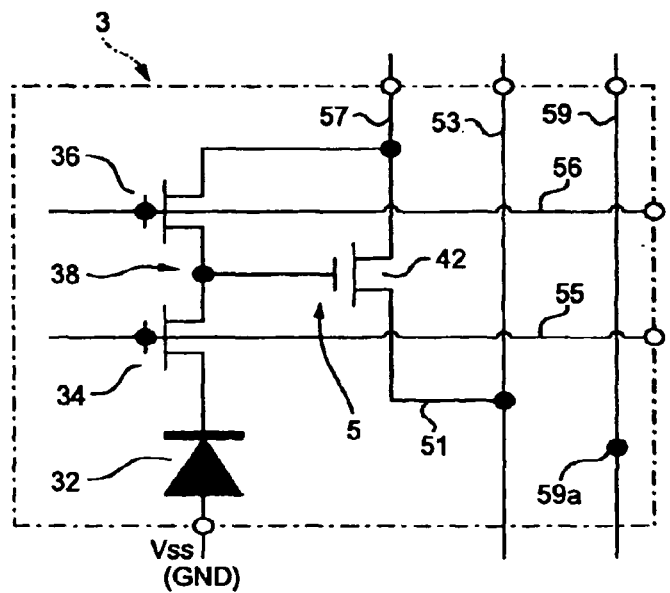
FIG. 17 is a figure explaining an improvement technique based on the third approach.

FIG. 17 explains the improvement technique based on the third approach. Herein, shown is a concept diagram noticing the unit pixel 3. In each pixel 3, a P-well bias line 59 for providing a potential to the P-well is arranged parallel with a vertical signal line 53 within the pixel, as shown in FIG. 17. In each pixel 3, a p-well contact (hereinafter referred also to as a well contact) 59a is provided as an example of contact connecting between the p-well bias line 59 and the well, at a predetermined point of the p-well bias line 59. This structure can suppress the fluctuation amount and time of P-well potential, thus making uniform the characteristic between the pixels at the periphery and at the center. Namely, it is effective in improving the saturation shading to apply the technique of suppressing the affection of P-well potential fluctuations with the use of the P-well contact 59a.

The contrivance based on the third approach is desirably implemented in place of taking the countermeasure of the first or second approach. Naturally, it may be combined with the countermeasure technique of the first or second approach.

For the pixel of a four-transistor structure having a select transistor allowing for a large-sized pixel, there have been a case that a well contact is provided within the pixel. However, it is apparent that no serious problem is encountered in the absence of a well contact, from the fact that no well contact is provided within the pixel on most CMOS sensors now released or commercially manufactured. Naturally, it is not provided in the improvement technique contrivance based on the first approach.

However, in the three-transistor structured unit pixel 3 omitted of the select transistor, the select transistor is omitted for the purpose of reducing the pixel size. The provision of the well contact 59a within the pixel runs counter to the pixel size reduction as shown FIG. 17. For this reason, if considering the usual design approach, there is less possibility to select a structure applying a well contact to the three-transistor structure.

Nevertheless, the provision of a well contact 59a within the pixel shown in FIG. 17 makes it possible to prevent against the phenomenon that saturation electrons decreases at the pixel-region center uniquely to the tree-transistor type omitted of the select transistor. Furthermore, the improvement technique based on the third approach offers great effect in that the area is required less than that having a select transistor.

Incidentally, although the illustrated example is prepared with a P-well contact 59a in each unit pixel 3, it is in order to prevent against the occurrence of image unevenness resulting from well voltage unevenness. Where such event is to be permitted, the P-well contacts 59a may be dispersed in arrangement point, e.g. every several pixel, without limited to every pixel.

<Improvement Technique Based on the Fourth Approach>

Now, explained is an improvement technique based on a fourth approach. The fourth approach is characterized in that the reset transistor 36 constituting the unit pixel 3 is made as a depression type, thereby eliminating the dynamic range reduction unique to the tree-transistor type having no select transistor. The circuit arrangement of the unit pixel 3 may be the same as that applied in the foregoing approach, wherein the difference is only in the device structure for use as a reset transistor 36.

First, explained is the problem of dynamic range reduction. In case the drain line 57 is continuously kept low, there is a case that electrons leak from the drain line 57 to the charge generating section 32 (photoelectric converter element) by way of the floating diffusion 38 thus resulting in noise occurrence. Consequently, the drain line 57 is held high in the horizontal effective period occupying most time. However, even in case the reset transistor 36 is off, electrons pass from the floating diffusion 38 onto the drain line 57 due to the leak current through the reset transistor 36, raising the potential at the floating diffusion 38. Particularly, there is confirmed a phenomenon that, particularly in low-speed operation, the potential at the floating diffusion 38 increases higher by 100 to 400 mV than the initial, within one frame.

The three-transistor type unit pixel 3 having no select transistor makes use of the nature to select the highest one in the potential at the floating diffusion 38 from among a plurality of pixels connected to the vertical signal line 53. In the selected pixel, the floating diffusion 38 is reset to high level and then the signal charge (photoelectrons) of the charge generating section 32 is transferred to the floating diffusion 38. Thereupon, FD potential is changed toward the lower.

Accordingly, when the FD potential rises on the non-selected pixel, there is decrease in the potential difference from the selected pixel, making it impossible to take a dynamic range. The phenomenon of dynamic range reduction is unique to the pixel of three-transistor type having no select transistor. The improvement technique based on the fourth approach uses the depression type of the reset transistor 36 in order to avoid such dynamic range reduction.

Figure 18A:
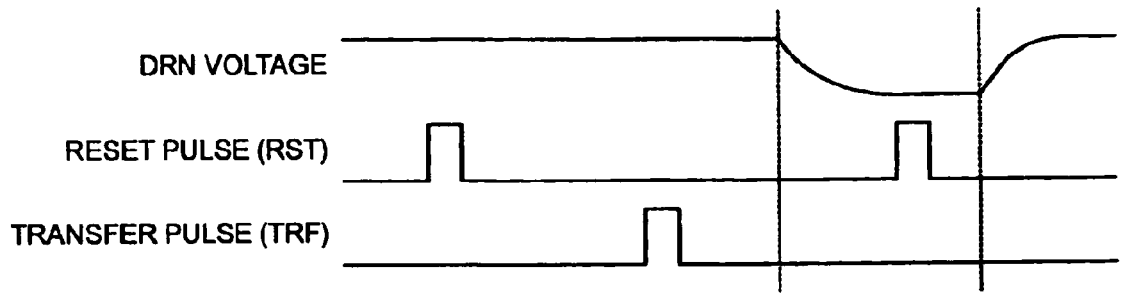
FIG. 18 is a figure explaining an improvement technique based on the fourth approach.
Figure 18B:
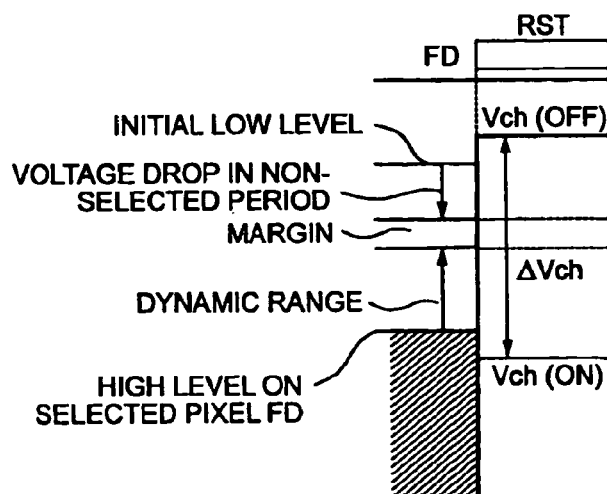
Figure 18C:
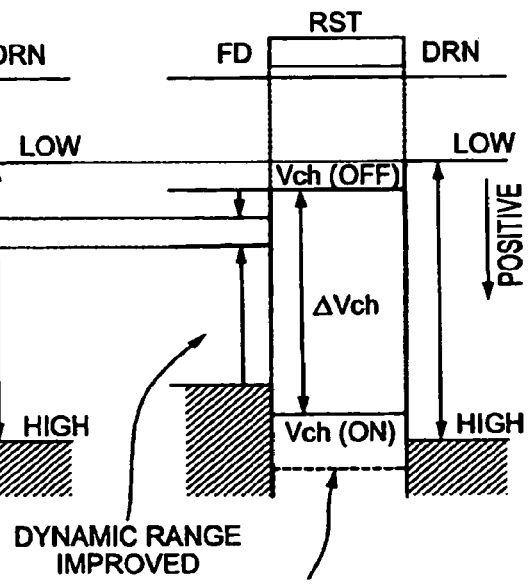

FIG. 18 explains the improvement technique based on the fourth approach. Here, FIG. 18A is a timing chart of drive pulse. Meanwhile, FIGS. 18B and 18C are a voltage potential chart.

In operation of the selected pixel, the floating diffusion 38 is set at high level by a first reset pulse (RST). Then, with a transfer pulse (TRF), signal charge is introduced into the floating diffusion 38, reducing the potential at the floating diffusion 38. It is the read condition that, at this time, the FD potential at the selected pixel is higher than the FD potential at the other pixel connected to the same vertical signal line 53. Thereafter, the drain line 57 is made low, to apply a rest pulse (RST). Thereupon, the floating diffusion 38 returns to the low.

FIGS. 18B and 18C are potential diagrams of the same. FIG. 18B is the case that the reset transistor 36 (shown "RST" in the figure) is not a depression type, wherein the initial low level is to be determined by the low level on the drain line 57. In a non-selected period of one frame, electrons gradually leak from the floating diffusion 38 (shown at "FD" in the figure) to the drain line 57 (shown at "DRN" in the figure), causing a voltage rise. Meanwhile, the floating diffusion 38 of a selected pixel has a high level determined by a channel voltage Vch (on) of upon turning on the reset transistor 36. Specifically, it assumes a somewhat low value. Receiving photoelectrons in that state, it is switched over to the low. Accordingly, the floating diffusion 38 has a dynamic range as shown in the figure, excepting the margin.

FIG. 18C is the case that the reset transistor 36 is a depression type. The channel voltage Vch shifts downward in the figure, correspondingly to a low threshold. However, in case the reset pulse RST has the same amplitude, the amplitude ΔVch of which is the same as that of FIG. 18(B). The initial low level is determined by the channel voltage Vch (off) of upon turning off the reset transistor 36. In FIG. 18B, there is a difference by a threshold amount between Vch (off) and initial low level. However, it does not exist in FIG. 18C.

In that state, electrons gradually leak. However, when the pixel on the next row is selected and the drain line 57 is switched over to the low, because the reset transistor 36 even if turned off is of the depression type, the floating diffusion 38 of the foregoing pixel again returns to the initial low level. Each time the processing proceeds row by row, the potential at the floating diffusion 38 returns to the initial low level. Accordingly, there is less potential rise even immediately after each frame.

From these reasons, as can be seen from FIG. 18C, in case the reset transistor 36 is made as a depression type, the dynamic range on the floating diffusion 38 can be broadened, thus making it possible to improve the problem of dynamic range reduction unique to the unit pixel 3 having a three-transistor structure having no vertical select transistor 40.

In this connection, by further deepening the degree of depression through the utilization of the margin, Vch (on) can be set higher than the high level on the drain line 57. Namely, the reset transistor 36 is made in such a deep depression type that can reset the floating diffusion 38 to the DRN-voltage high level when power voltage is supplied to the gate. Thereafter, in case the reset transistor 36 is turned off, the high level at the floating diffusion 38 is lowered by an amount of a contribution of field-though, etc. from the DRN-voltage high level. In this case, there is obtained a merit that the high level at the floating diffusion 38 is determined by the high level on the drain line 57 whereby the threshold variation of the reset transistor 36 is not put on the pixel output.

In the above, although the present invention was explained by using the embodiments, the technical scope of the invention is not to be limited by the scope as described in the embodiments. The foregoing embodiments can be modified or improved within a range not departing from the gist of the invention. The forms thus modified or improved are included within the technical scope of the invention.

Meanwhile, the foregoing embodiments are not to limit the inventions of the claims. Furthermore, all the combinations of the features explained in the embodiments are not necessarily required for the resolution means of the invention. The foregoing embodiments include the inventions in various phases. Various inventions can be extracted by a proper combination of a plurality of constituent elements disclosed. Even in case some constituent elements are deleted from all the constituent elements shown in the embodiment, the structure deleted of the some constituent elements is to be extracted as an invention as long as effect is available.

For example, the improvement technique based on the first approach showed the arrangement example that can increase the transition time of upon turning off the drain-line voltage even when supplied with a drive pulse having the usual pulse form to be inputted to the DRN drive buffer 140. The concrete means for achieving this applied the technique that makes proper the W/L ratio of the transistor constituting the drive buffer or make proper the operation current during drive by the use of control resistances or current sources.

However, without limited to these arrangements, various control techniques and arrangements can be used as long as voltage transition time is increased on the drain line, which are also included in the technical idea of the invention.

For example, the arrangement may be such that the unit pixels in three-transistor structure similar to those of the conventional are used on the device while the drive signal for input to the DRN drive buffer 140 be not in a pulse form but blunted in its waveform to meet the foregoing condition. In order for this, between the timing generator for generating a pulse-formed drive signal and the device (vertical scanning circuit 14 in the above example), a waveform shaping circuit is preferably provided to blunt the pulse in a manner meeting the foregoing condition. This can make even the characteristic at between the peripheral pixel and the center pixel similarly to the explanations in the above embodiments, thus reducing saturation shading.

Meanwhile, the above embodiment explained as an example the sensor configured by the NMOS-structured unit pixels. However, this is not limitative, i.e. those configured by the PMOS-structured pixels can enjoy the similar operation/effect to those explained in the above embodiment by reversing the potential relationship (reversing the positive and negative of potential).

Meanwhile, the above embodiment, although exemplified the pixel having one photodiode and three transistors, the present invention is not limited to the embodiment, is similarly applied to the pixel principally similar in operation, e.g. each one of reset transistor and amplifier transistor is shared for two photodiodes and two read select transistors.

Meanwhile, although the above noticed saturation shading empirically greatest in affection, it is apparent that, in case potential is difficult in fluctuation at between the center and the periphery of the pixel region, the other characteristic than saturation signal amount possesses shading. Blunting the fall time or rise time for driving the drain line improves the other shading phenomenon than saturation signal amount because of reducing well potential fluctuation and brings it into a uniform.

Meanwhile, the solid-state imaging device of the invention does not refer only to the one-chip device but means a concept including a camera module and camera including an optical system and a signal processor chip.

As described above, the present invention provides an improvement technique based on a first approach for suppressing the saturation shading phenomenon in the solid-state imaging device having unit pixels in a three-transistor structure. This applies a technique of making proper the W/L ratio of a transistor structuring a drain drive buffer or of making proper the operation current during drive by use of a control resistance or current source, thereby increasing the transition time upon turning off the drain voltage longer, e.g. five times or greater and ten thousand times or smaller, than the transition time in turning off any of the reset line and transfer line. This makes it possible to make uniform the characteristic of the pixels at the periphery and at the center, and hence to reduce saturation shading amount.

Likewise, in the improvement technique based on the second approach for suppressing the saturation shading phenomenon, internally or externally provided is a voltage source for making the transfer-gate low level voltage a voltage value in a magnitude sufficient for forming a potential barrier against charge leak from the charge generating section to the charge storing section. This can suppress the phenomenon that saturation voltage decreases at pixel-region center. As a result, saturation shading amount can be reduced.

Likewise, in the improvement technique based on the third approach for suppressing the saturation shading phenomenon, a bias line is structurally provided to fix the well potential. This can prevent the reduction of saturation electrons at the pixel-region center due to well-potential fluctuation, decreasing the amount of shading.

Meanwhile, in the technique for resolving the problem of dynamic range reduction in the solid-state imaging device having unit pixels in a three-transistor structure (improvement technique based on the fourth approach), the reset transistor of the reset section structuring the unit pixel is provided as a depression type. This can suppress the leak current caused by the reset transistor. This can broaden the dynamic range at the charge storing part. Thus, the dynamic range conventionally restricted at the floating diffusion (charge storing part) can be broadened.

What is claimed is:

1. A solid-state imaging device comprising:
   unit pixels including:
   a charge generating section for generating a signal charge corresponding to an amount of received light,
   a charge storing part for storing the signal charge,
   a transfer gate section arranged between the charge generating section and the charge storing part for transferring the signal charge generated by the charge generating section to the charge storing part,
   a pixel signal generating section for generating a pixel signal commensurate with the signal charge stored at the charge storing part, and
   a reset section for resetting the signal charge at the charge storing part;
   a drain line provided connected commonly with other unit pixels and connected to the reset section and the pixel signal generating section, wherein a drain voltage is blunted during off transition by a factor of from 3 to 10000 times; and wherein a buffer for driving the drain line and for forming a drive current is inserted between a low power line and a reference power source.

2. The solid-state imaging device according to claim 1, incorporating a voltage generating circuit for generating the off voltage.

3. The solid-state imaging device according to claim 1, incorporating a signal line provided for receiving the pixel signal generated by the pixel signal generating section and connected commonly with other unit pixels; and
wherein a pixel select operation for outputting the pixel signal generated by the pixel signal generating section line onto the signal line which is performed by potential control at the charge storing part.

4. The solid-state imaging device according to claim 1, wherein an off voltage is supplied to the transfer gate section having a voltage value reverse in polarity to an on voltage that is supplied to the transfer gate section, the off of voltage is a voltage having a difference that is greater than .7V from a master voltage regulating a reference voltage for the unit pixels and a magnitude in a range not to cause breakdown of the unit pixel, and further wherein pixel selection is performed via the reset transistor by altering a potential of the drain line and further wherein a voltage supplied to the transfer gate is determined in order to suppress saturation and/or shading.

5. The solid-state imaging device according to claim 3, wherein the unit pixels are comprised of a well formed in a semiconductor, the off voltage being a voltage in a magnitude capable of generating a channel at an interface of the semiconductor forming the unit pixels.

\* \* \* \* \*